(12) United States Patent
Trummer

(10) Patent No.: US 11,113,275 B2
(45) Date of Patent: Sep. 7, 2021

(54) VERIFYING TEXT SUMMARIES OF RELATIONAL DATA SETS

(71) Applicant: Cornell University, Ithaca, NY (US)

(72) Inventor: Immanuel Trummer, Ithaca, NY (US)

(73) Assignee: Cornell University, Ithaca, NY (US)

( * ) Notice: Subject to any disclaimer, the term of this patent is extended or adjusted under 35 U.S.C. 154(b) by 0 days.

(21) Appl. No.: 16/761,839

(22) PCT Filed: Nov. 6, 2018

(86) PCT No.: PCT/US2018/059408
§ 371 (c)(1),
(2) Date: May 6, 2020

(87) PCT Pub. No.: WO2019/090318
PCT Pub. Date: May 9, 2019

(65) Prior Publication Data
US 2021/0200762 A1    Jul. 1, 2021

Related U.S. Application Data

(60) Provisional application No. 62/582,053, filed on Nov. 6, 2017.

(51) Int. Cl.
*G06F 16/2452* (2019.01)
*G06F 40/205* (2020.01)
(Continued)

(52) U.S. Cl.
CPC .... *G06F 16/24522* (2019.01); *G06F 16/2272* (2019.01); *G06F 16/24578* (2019.01); *G06F 40/205* (2020.01)

(58) Field of Classification Search
CPC ......... G06F 16/24522; G06F 16/24578; G06F 40/205; G06F 16/2272
See application file for complete search history.

(56) References Cited

U.S. PATENT DOCUMENTS 7,454,430 B1   11/2008 Komissarchik et al.
8,990,234 B1 * 3/2015 Myslinski ........... G06F 16/2365
                                                     707/758
(Continued)

FOREIGN PATENT DOCUMENTS

WO  PCT/US2018/059408        2/2019

OTHER PUBLICATIONS

M. L. Ba et al., "VERA: A Platform for Veracity Estimation over Web Data," WWW'16 Companion, Apr. 11-15, 2016, pp. 159-162.
(Continued)

*Primary Examiner* — Albert M Phillips, III
(74) *Attorney, Agent, or Firm* — Ryan, Mason & Lewis, LLP

(57) ABSTRACT

A processing platform in illustrative embodiments comprises one or more processing devices each including at least one processor coupled to a memory. The processing platform is configured to obtain a text document containing at least one claim about data of a relational database. Claim keywords are extracted from the text document, and query fragments are identified based at least in part on indexing of one or more relational data sets of the relational database. The relevance of the claim keywords to the query fragments is determined, and candidate queries are identified based at least in part on probabilistic inferencing from the determined relevance of the claim keywords to the query fragments. The candidate queries are evaluated against the relational database, and consistency of the claim with the data of the relational database is determined based at least in part on results of the evaluation of the candidate queries.

22 Claims, 12 Drawing Sheets

(51) Int. Cl.
  *G06F 16/2457* (2019.01)
  *G06F 16/22* (2019.01)

(56) References Cited

U.S. PATENT DOCUMENTS

| | | | |
|---|---|---|---|
| 9,672,251 | B1 | 6/2017 | Whang et al. |
| 2006/0293879 | A1 | 12/2006 | Zhao et al. |
| 2009/0089236 | A1 | 4/2009 | Lamprecht et al. |
| 2012/0317593 | A1 | 12/2012 | Myslinski |
| 2013/0074110 | A1 | 3/2013 | Myslinski |
| 2014/0040249 | A1 | 2/2014 | Ploesser et al. |
| 2016/0050221 | A1 | 2/2016 | Myslinski |
| 2016/0070742 | A1 | 3/2016 | Myslinski |
| 2016/0275347 | A1 | 9/2016 | Sukhodolov et al. |
| 2016/0371321 | A1 | 12/2016 | Myslinski |
| 2016/0378856 | A1 | 12/2016 | Myslinski |

OTHER PUBLICATIONS

P. Shiralkar et al., "Finding Streams in Knowledge Graphs to Support Fact Checking," arXiv:1708.07239v1, Aug. 24, 2017, 10 pages.

W. Ferreira et al., "Emergent: A Novel Data-set for Stance Classification," Proceedings of NAACL-HLT 2016, Jun. 12-17, 2016, pp. 1163-1168.

N. Hassan et al., "The Quest to Automate Fact-Checking," Computational Journalism, Oct. 2015, 5 pages.

M. Dusmanu et al., "Argument Mining on Twitter: Arguments, Facts and Sources," Proceedings of the 2017 Conference on Empirical Methods in Natural Language Processing, Sep. 7-11, 2017, pp. 2317-2322.

B. Walenz et al., "Perturbation Analysis of Database Queries," Proceedings of the VLDB Endowment, vol. 9, No. 14, 2016, pp. 1635-1646.

I. Habernal et al., "Argumentation Mining in User-Generated Web Discourse," arXiv:1601.02403v5, Mar. 27, 2017, 55 pages.

M. Heilman et al., "Question Generation via Overgenerating Transformations and Ranking," CMU-LTI-09-013, www.lti.cs.cmu.edu, 2009, 16 pages.

M. Heilman et al., "Good Question! Statistical Ranking for Question Generation," Human Language Technologies: The 2010 Annual Conference of the North American Chapter of the Association for Computational Linguistics, Jun. 2010, 9 pages.

C. Bialik, "Sitting Presidents Give Way More Commencement Speeches Than They Used to," https://fivethirtyeight.com/features/sitting-presidents-give-way-more-commencement-speeches-than-they-used-to/, May 11, 2016, 3 pages.

F. Li et al., "Constructing an Interactive Natural Language Interface for Relational Databases," Proceedings of the VLDB Endowment, vol. 8, No. 1, Aug. 31-Sep. 4, 2015, pp. 73-84.

M. Lippi et al., "Context-Independent Claim Detection for Argument Mining," Proceedings of the Twenty-Fourth International Joint Conference on Artificial Intelligence, 2015, pp. 185-191.

M. Lippi et al., "Argumentation Mining: State of the Art and Emerging Trends," ACM Transactions on Internet Technology, vol. 16, No. 2, Article 10, Mar. 2016, 25 pages.

M. Lippi et al., "MARGOT: A Web Server for Argumentation Mining," Expert Systems with Applications, vol. 65, No. 15, Dec. 2016. Abstract Only.

J. Mueller et al., "Siamese Recurrent Architectures for Learning Sentence Similarity," Proceedings of the Thirtieth AAAI Conference on Artificial Intelligence, 2016, pp. 2786-2792.

A. Peldszus et al, "From Argument Diagram to Argumentation Mining in Texts: A Survey," International Journal of Cognitive Informatics and Natural Intelligence, vol. 7, No. 1, Jan.-Mar. 2013, 31 pages.

A. K. McCallum, "MALLET: A Machine Learning for Language Toolkit," https://people.cs.umass.edu/~mccallum/mallet/, 2002, 2 pages.

A. McCann, "The NFL's Uneven History of Punishing Domestic Violence," https://fivethirtyeight.com/features/nfl-domestic-violence-policy-suspensions/, Aug. 28, 2014, 8 pages.

S. Jo et al, "The FactChecker: Verifying Text Summaries of Relational Data Sets," Proceedings of ACM SIGMOD Conference, 2017, 15 pages.

S. Jo et al, "Verifying Text Summaries of Relational Data Sets," arXiv:1804.07686v2, Aug. 30, 2018, 18 pages.

D. Suelmann, "Keyword-based Search in a Relational Database," http://ww.let.rug.nl/alfa/ba/DanielSuelmann.pdf., Aug. 2009, pp. 1-57.

S. Agrawal et al., "DBXplorer: A System for Keyword-Based Search over Relational Databases," Proceedings 18th International Conference on Data Engineering, IEEE, Aug. 7, 2002, 12 pages.

E. Baumer et al., "Comparing Grounded Theory and Topic Modeling: Extreme Divergence or Unlikely Convergence?," Journal of the Association for Information Science and Technology, Apr. 28, 2017, pp. 1397-1410, vol. 68, No. 6.

A. Keyaki et al., "A Query-Oriented XML Fragment Search Approach on a Relational Database System," Journal of Digital Information Management, Jun. 2010, pp. 175-180, vol. 8, No. 3.

M. Babakar et al., "The State of Automated Factchecking," Full Fact, 2016, 36 pages.

G. L. Ciampaglia et al., "Computational Fact Checking from Knowledge Networks," arXiv:1501.03471v1 [cs.CY], Jan. 14, 2015, 20 pages.

D. Willis, "Looking for John McCain? Try a Sunday Morning Show," The New York Times, https://www.nytimes.com/2014/09/06/upshot/looking-for-john-mccain-try-a-sunday-morning-show.html, Sep. 5, 2014, 2 pages.

C. B. Do et al, "What is the Expectation Maximization Algorithm?" Nature Biotechnology, vol. 26, No. 8, Aug. 2008, pp. 897-899.

W. Hickey, "41 Percent of Fliers Think You're Rude If You Recline Your Seat," FiveThirtyEight, https://fivethirtyeight.com/features/airplane-etiquette-recline-seat/, Sep. 6, 2014, 4 pages.

N. Silver, "Blatter's Reign at FIFA Hasn't Helped Soccer's Poor," FiveThirtyEight, https://fivethirtyeight.com/features/blatters-reign-at-fifa-hasnt-helped-soccers-poor/, Jun. 9, 2015, 8 pages.

A. McCann "Hip-Hop Is Turning on Donald Trump," FiveThirtyEight, https://projects.fivethirtyeight.com/clinton-trump-hip-hop-lyrics/, Jul. 14, 2016, 58 pages.

N. Hassan et al., "Toward Automated Fact-Checking: Detecting Check-worthy Factual Claims by ClaimBuster," Proceedings of the 23rd ACM SIGKDD International Conference on Knowledge Discovery and Data Mining, Halifax, NS, Canada, Aug. 13-17, 2017, pp. 1803-1812.

N. Hassan et al., "ClaimBuster: The First-ever End-to-end Fact-checking System," Proceedings of the VLDB Endowment, vol. 10, No. 7, Aug. 2017, 4 pages.

G. Karadzhov et al., "Fully Automated Fact Checking Using External Sources," arXiv:1710.00341v1 [cs.CL], Oct. 1, 2017, 10 pages.

F. Li et al., "NaLIR: An Interactive Natural Language Interface for Querying Relational Databases," Proceedings of the 2014 ACM SIGMOD International Conference on Management of Data, Jun. 2014, pp. 709-712.

C. D. Manning et al., The Stanford CoreNLP Natural LanguageProcessing Toolkit, Proceedings of the 52nd Annual Meeting of the Association for Computational Linguistics, ACL 2014, Jun. 22-27, 2014, Baltimore, MD, USA, pp. 55-60.

G. A. Miller, "WordNet: A Lexical Database for English," Communications of the ACM, vol. 38, No. 11, Nov. 1995, 3 pages.

N. Nakashole et al., "Language-Aware Truth Assessment of Fact Candidates," Proceedings of the 52nd Annual Meeting of the Association for Computational Linguistics, Baltimore, MD, USA, Jun. 22-27, 2014, vol. 1, pp. 1009-1019.

D. Saha et al., "ATHENA: An Ontology-Driven System for Natural Language Querying over Relational Data Stores," Proceedings of the VLDB Endowment, Aug. 2016, pp. 1209-1220.

B. Shi et al., "Discriminative Predicate Path Mining for Fact Checking in Knowledge Graphs," arXiv:1510.05911v2 [cs.DB], Apr. 15, 2016, 17 pages.

(56) References Cited

OTHER PUBLICATIONS

B. Shi et al., "Fact Checking in Heterogeneous Information Networks," Proceedings of the 25th International Conference on World Wide Web, Montreal, Canada, Apr. 11-15, 2016, Companion Volume, pp. 101-102.
Stack Overflow, "2015 Developer Survey," https://insights.stackoverflow.com/survey/2015, Accessed May 4, 2020, 32 pages.
Stack Overflow, "2016 Developer Survey," https://insights.stackoverflow.com/survey/2016, Accessed May 4, 2020, 21 pages.
Stack Overflow, "2017 Developer Survey," https://insights.stackoverflow.com/survey/2017, Accessed May 4, 2020, 41 pages.
J. Thorne et al., "An Extensible Framework for Verification of Numerical Claims," Proceedings of the 15th Conference of the European Chapter of the Association for Computational Linguistics, Valencia, Spain, Apr. 3-7, 2017, pp. 37-40.
A. Vlachos et al., "Fact Checking: Task Definition and Dataset Construction," Proceedings of the ACL 2014 Workshop on Language Technologies and Computational Social Science, Baltimore, MD, USA, Jun. 26, 2014, pp. 18-22.
A. Vlachos et al., "Identification and Verification of Simple Claims about Statistical Properties," Proceedings of the 2015 Conference on Empirical Methods in Natural Language Processing, Lisbon, Portugal, Sep. 17-21, 2015, pp. 2596-2601.
W. Y. Wang, ""Liar, Liar Pants on Fire": A New Benchmark Dataset for Fake News Detection," Proceedings of the 55th Annual Meeting of the Association for Computational Linguistics, Vancouver, Canada, Jul. 30-Aug. 4, vol. 2, papers 422-426.
Y. Wu et al., "Toward Computational Fact-Checking," Proceedings of the VLDB Endowment, Mar. 2014, pp. 589-600.
Y. Wu et al., "Computational Fact Checking through Query Perturbations," ACM Transactions on Database Systems, Jan. 2017, vol. 42, No. 1, 41 pages.
Y. Wu et al., "iCheck: Computationally Combating "Lies, D-ned Lies, and Statistics"," International Conference on Management of Data, Snowbird, UT, USA, Jun. 22-27, 2014, pp. 1063-1066.

\* cited by examiner

FIG. 3

| NAME | GAMES | CATEGORY | ... |
|---|---|---|---|
| A. KARRAS | 14 | PERSONAL CONDUCT | |
| A. JONES | 20 | PERSONAL CONDUCT | |
| L. BRAZILL | INDEF | SUBSTANCE ABUSE, REPEATED OFFENSE | |
| G. MILLER | 4 | PEDs | |
| ... | | | ... |

(a) RAW RELATIONAL DATA

THERE WERE ONLY [FOUR] PREVIOUS LIFETIME BANS IN MY DATABASE – [THREE] WERE FOR REPEATED SUBSTANCE ABUSE, [ONE] WAS FOR GAMBLING. ...

(b) TEXT DOCUMENT. CLAIMS ARE HIGHLIGHTED. WE FOCUS ON CLAIMED RESULT 'ONE'.

| FRAGMENT | KEYWORDS |
|---|---|
| COUNT(*) | TOTAL, NUMBER, ... |
| SUM(GAMES) | SUM, TOTAL, GAME, ... |
| ... | ... |
| CATEGORY = 'PEDs' | CATEGORY, PED, DRUG, ... |
| GAMES = 'INDEF' | GAMES, INDEF, INDEFINITE, ... |
| ... | ... |

(c) QUERY FRAGMENTS

| KEYWORD | SOURCE | WEIGHT |
|---|---|---|
| GAMBLING | CLAIM SENTENCE | 1.0 |
| ABUSE | CLAIM SENTENCE | 0.5 |
| ... | ... | |
| LIFETIME | PREVIOUS SENTENCE | 0.1 |
| BANS | PREVIOUS SENTENCE | 0.1 |
| ... | ... | |

(d) KEYWORDS AND THEIR WEIGHTS (SPECIFIC TO CLAIMED RESULT 'ONE').

FIG. 3 (Cont'd)

| QUERY CANDIDATES | PRIOR PROBABILITY | KEYWORD PROBABILITY | EVALUATION RESULT | REFINED PROBABILITY |
|---|---|---|---|---|
| SELECT COUNT(*) WHERE GAMES = 'INDEF' AND CATEGORY = 'GAMBLING' | 0.057 | 0.008 | 1 | 0.197 |
| SELECT COUNT(*) WHERE CATEGORY = 'GAMBLING' | 0.137 | 0.012 | 5 | 0.059 |
| ... | | | | |
| SELECT PERCENTAGE(CATEGORY) WHERE CATEGORY = 'GAMBLING' | 0.011 | 0.012 | 1.86 | 0.006 |
| SELECT SUM(GAMES) WHERE CATEGORY = 'SUBSTANCE ABUSE' | 0.011 | 0.006 | 763398 | 0.002 |
| ... | | | | |

(e) PROBABILITY DISTRIBUTION AND EVALUATION RESULTS OF QUERY CANDIDATES

*FIG. 3 (Cont'd)*

| QUERY FRAGMENT | INITIAL PRIOR | ... | FINAL PRIOR |
|---|---|---|---|
| COUNT(*) | 0.025 | ... | 0.150 |
| SUM(GAMES) | 0.025 | ... | 0.012 |
| ... | | | |
| GAMES = (ANY VALUE) | 0.143 | ... | 0.417 |
| CATEGORY = (ANY VALUE) | 0.143 | ... | 0.297 |
| ... | | | |

(f): CHANGING PRIORS DURING EM ITERATIONS UNTIL CONVERGENCE

FIG. 5

ALGORITHM 1: MAPS EACH CLAIM TO POTENTIALLY RELEVANT QUERY FRAGMENTS BASED ON KEYWORDS

```
1:   // Calculates claim-specific relevance scores for query
2:   // fragments on database D for claims C from text T.
3:   function KEYWORDMATCH(T, D, C)
4:       // Index query fragments by keywords
5:       I ← INDEXFRAGMENTS(D)
6:       // Iterate over claims
7:       for c ∈ C do
8:           // Retrieve claim-specific keyword context
9:           K ← CLAIMKEYWORDS(c, T)
10:          // Calculate relevance scores for query fragments
11:          Sc ← IRRETRIEVAL(I, K)
12:      end for
13:      return {S_c | c ∈ C}
14:  end function
```

FIG. 6

ALGORITHM 2: EXTRACTS A SET OF KEYWORDS FOR A CLAIM

```
 1:  // Extract keywords for claim c from text T.
 2:  function CLAIMKEYWORDS(c, T)
 3:      // Initialize weighted keywords
 4:      K ← ∅
 5:      // Add keywords in same sentence
 6:      for word ∈ c.sentence do
 7:          weight ← 1/TREEDISTANCE(word, c)
 8:          K ← K ∪ {<word, weight>}
 9:      end for
10:      // Add keywords of sentences in same paragraph
11:      m ← min{1/TREEDISTANCE(k, c) | k ∈ c.sentence}
12:      K ← K ∪ {<k, 0.4m> | k ∈ c.prevSentence}
13:      K ← K ∪ {<k, 0.4m> | k ∈ c.paragraph.firstSentence}
14:      // Add keywords in preceding headlines
15:      s ← c.containingSection
16:      while s ≠ null do
17:          K ← K ∪ {<k, 0.7m> | k ∈ s.headline.words}
18:          s ← s.containingSection
19:      end while
20:      return K
21: end function
```

FIG. 7

ALGORITHM 3: LEARN DOCUMENT-SPECIFIC PROBABILITY DISTRIBUTION OVER QUERIES AND REFINE BY EVALUATING QUERY CANDIDATES

```
 1:   // Calculate for each claim in C a distribution over
 2:   // matching queries on database D using relevance
 3:   // scores S via expectation maximization.
 4:   function QUERYANDLEARN(D, C, S)
 5:       // Initialize priors describing text document
 6:       Θ ← UNIFORM
 7:       // Iterate EM until convergence
 8:       while Θ no converged yet do
 9:           // Treat each factual claim
10:           for c ∈ C do
11:               // Calculate keyword-based probability
12:               Q_c ← TEXTPROBABILITY(S, Θ)
13:           end for
14:           // Refine probability via query evaluations
15:           Q ← REFINEBYEVAL({Q_c | c ∈ C}, C, D)
16:           // Update document-specific priors
17:           Θ ← MAXIMIZATION({Q_c | c ∈ C})
18:       end while
19:       return {Q_c | c ∈ C}
20:   end function
```

*FIG. 9*

ALGORITHM 4: REFINE QUERY PROBABILITIES BY EVALUATIONS

1: // Calculate aggregates $S_{FA}$ on data $D$ for row sets
2: // defined by predicates on columns $G$ with non-zero
3: // probability according to query distribution $Q$.
4: function CUBE($Q, D, G, S_{FA}$)
5:     // Collect directly referenced tables
6:     $T \leftarrow \{\text{TABLE}(x) \mid <f, x> \in S_{FA} \lor x \in D\}$
7:     // Add tables and predicates on join paths
8:     $T \leftarrow T \cup \{\text{JOINPATHTABLES}(t_1, t_2) \mid t_1, t_2 \in T\}$
9:     $J \leftarrow \{\text{JOINPATHPREDS}(t_1, t_2) \mid t_1, t_2 \in T\}$
10:     // Collect relevant literals for *any* claim
11:     $L \leftarrow \{\text{LITERALS}(r) \mid r \in D \land \exists c \in C : \Pr(l \mid Q_c) > 0\}$
12:     return EXECUTEQUERY($D$, "
        SELECT $S_{FA}, D$ FROM
            (SELECT $S_{FA}$, INORDEFAULT($P,L$)
              FROM $T$ WHERE $J$ ) CUBE BY P ")
13: end function

ALGORITHM 4

14: // Refine probabilities $Q$ for claims $C$ on data $D$.
15: procedure REFINEBYEVAL($Q, C, D$)
16:     // Evaluate likely queries for each claim
17:     for $c \in C$ do
18:         // Pick scope for query evaluations
19:         $<S_F, S_A, S_R> \leftarrow$ PICKSCOPE($Q, C, D$)
20:         //Initialize query evaluation results
21:         $E \leftarrow \emptyset$
22:         // Iterate over predicate column group
23:         for $G \subseteq S_R : |G| = n_G(|S_R|)$ do
24:             // Form likely aggregates
25:             $S_{FA} \leftarrow F \times A$
26:             // Exploit cache content
27:             for $fa \in S_{FA} |$ ISCACHED($fa, G$) do
28:                 $E \leftarrow E \cup$ CACHEGET($fa, G$)
29:                 $S_{FA} \leftarrow S_{FA} \setminus \{fa\}$
30:             end for
31:             // Generate missing results
32:             $E \leftarrow E \cup$ CUBE($Q, D, G, S_{FA}$)
33:             // Store in cache for reuse
34:             CACHEPUT($S_{FA}, G, E$)
35:         end for
36:         // Refine query probabilities
37:         $Q_c \leftarrow$ REFINE($Q_c, E$)
38:     end for
39:     return $Q$
40: end procedure

VERIFYING TEXT SUMMARIES OF RELATIONAL DATA SETS

PRIORITY CLAIM

The present application claims priority to U.S. Provisional Patent Application Ser. No. 62/582,053 filed Nov. 6, 2017 and entitled "Fact Checker: Verifying Text Summaries of Relational Data Sets," which is incorporated by reference herein in its entirety.

FIELD

The field relates generally to information processing systems, and more particularly to processing relational data.

BACKGROUND

It is important in many applications to determine the correctness of statements in text documents. However, conventional approaches generally exhibit very limited functionality and are deficient in terms of their accuracy and efficiency. For example, some conventional approaches verify facts by exploiting natural language fact checks prepared by human fact checkers, natural language query interfaces to existing knowledge bases, or textual web query results, resulting in substantial limitations in their fact-checking functionality. Accordingly, a need exists for an improved approach.

SUMMARY

Illustrative embodiments of the invention provide accurate and efficient verification of text summaries of relational data sets. These embodiments can achieve significantly improved performance in automated or semi-automated fact checking, and in numerous other text summary verification contexts, relative to conventional approaches. For example, unlike the above-noted conventional approaches that verify facts by exploiting natural language fact checks prepared by human fact checkers, natural language query interfaces to existing knowledge bases, or textual web query results, illustrative embodiments can perform fact checking utilizing raw relational data, with high levels of accuracy and efficiency.

A processing platform in illustrative embodiments comprises one or more processing devices each including at least one processor coupled to a memory. The processing platform is configured to obtain a text document containing at least one claim about data of a relational database. Claim keywords are extracted from the text document, and query fragments are identified based at least in part on indexing of one or more relational data sets of the relational database. The relevance of the claim keywords to the query fragments is determined, and candidate queries are identified based at least in part on probabilistic inferencing from the determined relevance of the claim keywords to the query fragments. The candidate queries are evaluated against the relational database, and consistency of the claim with the data of the relational database is determined based at least in part on results of the evaluation of the candidate queries.

These and other embodiments of the invention include but are not limited to information processing systems, methods, apparatus, processing devices, integrated circuits, and computer program products comprising processor-readable storage media having software program code embodied therein.

BRIEF DESCRIPTION OF THE FIGURES

FIG. 3 is a multi-part figure showing examples of raw relational data, a text document, query fragments, keywords and their weights, a probability distribution and corresponding evaluation results for query candidates, and changing priors for query fragments, in an illustrative embodiment.

FIG. 5 shows pseudocode of an example process for mapping claims to potentially relevant query fragments in an illustrative embodiment.

FIG. 6 shows pseudocode of an example process for extracting a set of keywords for a claim in an illustrative embodiment.

FIG. 7 shows pseudocode of an example process for learning a document-specific probability distribution over queries and refining it by evaluating query candidates in an illustrative embodiment.

FIG. 9 shows pseudocode of an example process for refining query probabilities by evaluations in an illustrative embodiment.

DETAILED DESCRIPTION

Embodiments of the invention can be implemented, for example, in the form of information processing systems comprising one or more processing platforms each including at least one computer, server or other processing device. Illustrative embodiments of such systems will be described in detail herein. It should be understood, however, that embodiments of the invention are more generally applicable to a wide variety of other types of information processing systems and associated computers, servers or other processing devices or other components. Accordingly, the term "information processing system" as used herein is intended to be broadly construed so as to encompass these and other arrangements.

Figure 1:
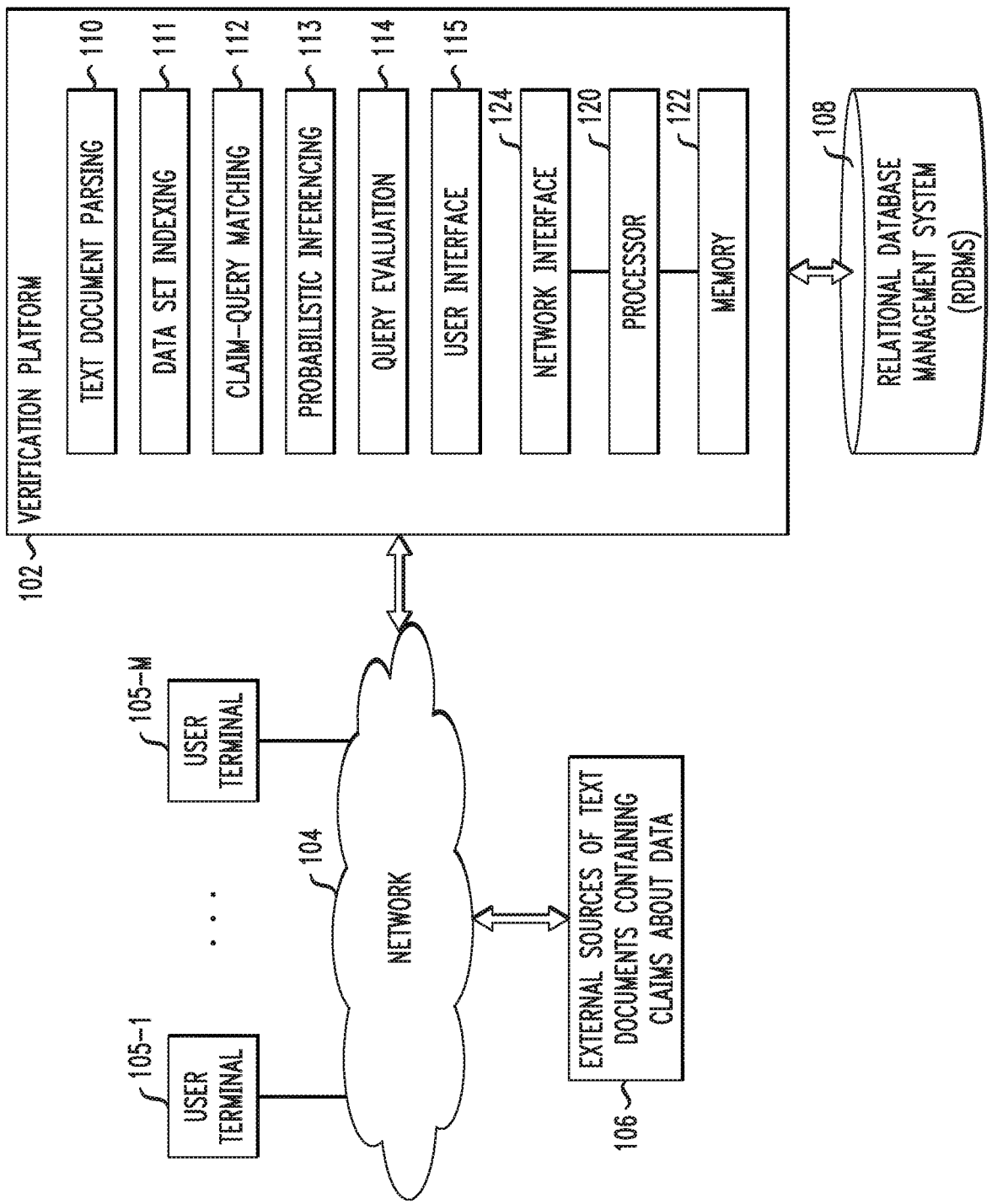
FIG. 1 shows an information processing system configured with functionality for verifying text summaries of relational data sets in an illustrative embodiment.

FIG. 1 shows an information processing system 100 implementing functionality for verifying text summaries of relational data sets in an illustrative embodiment. The system 100 comprises a verification platform 102 coupled to a network 104. Also coupled to the network 104 are user terminals 105-1, . . . 105-M and external sources 106 of text documents containing claims about data. The verification platform 102 is configured to verify text summaries of relational data sets of a relational database managed by a relational database management system (RDBMS) 108. Information characterizing the relational data sets can be obtained by the verification platform 102 directly from the RDBMS 108.

The term "relational database" as used herein is intended to be broadly construed, and in some embodiments is assumed to be part of its corresponding RDBMS such as RDBMS 108. A given RDBMS as that term is broadly used herein can therefore comprise one or more relational databases that are subject to its management. The relational database can also be separate from the RDBMS. For example, it can be stored in a storage array or other type of storage system that is coupled to a processing platform that implements the RDBMS. A given relational database as that term is broadly used herein illustratively comprises one or more relational data sets. The relational data sets comprise data of the relational database.

The verification platform 102 comprises a plurality of modules configured to collectively implement functionality for verifying text summaries of relational data sets, including a text document parsing module 110, a data set indexing module 111, a claim-query matching module 112, a probabilistic inferencing module 113, a query evaluation module 114 and a user interface module 115.

In operation, the verification platform 102 obtains a text document containing at least one claim about data associated with a relational database managed by the RDBMS 108, extracts claim keywords from the text document in text document parsing module 110, identifies query fragments in data set indexing module 111 based at least in part on indexing of one or more relational data sets of the relational database, determines relevance of the claim keywords to the query fragments in claim-query matching module 112, identifies candidate queries based at least in part on probabilistic inferencing from the determined relevance of the claim keywords to the query fragments in probabilistic inferencing module 113, and evaluates the candidate queries against the relational database using query evaluation module 114.

Evaluation of the candidate queries against the relational database illustratively comprises merging the candidate queries into batches as described elsewhere herein, and submitting the batches of merged candidate queries to the RDBMS 108 for evaluation against the relational database.

The verification platform 102 is further configured to determine consistency of the claim with the data of the relational database based at least in part on results of the evaluation of the candidate queries, and to present an indication of the determined consistency of the claim to a user via the user interface module 115.

In some embodiments, we use the results of query evaluations to refine our claim-to-query translation probabilities. For example, assume we have a claim "The average salary is $60,320" and one candidate query evaluates exactly to 60,320 as its result. The probability of this query being the correct one increases, and this will increase the probability of the corresponding aggregation column in the document-specific a-priori distribution, which will change the probabilities for candidate queries for other claims in the same text document.

The verification platform 102 in some embodiments is further configured to generate a probability of correctness for the claim, and to modify presentation via the user interface module 115 of at least a portion of the text document containing the claim based at least in part on the probability of correctness.

For example, when calculating the correctness probability of claims, we base it on the probability of claim-to-query translations (e.g., if the probability that a text claim translates into query candidate Q1 is 25% and the probability that it translates into query candidate Q2 is 75% and the result of Q1 is consistent with the number that appears in the claim while Q2 is not then the correctness probability is 25%).

The term "text document" as used herein is intended to be broadly construed, and illustratively comprises a set of one or more sentences, paragraphs or other arrangements of textual information. Such a text document can therefore comprise, for example, a portion of a text file comprising textual information including at least one claim. A "text summary" as that term is broadly used herein may be viewed as an example of a type of text document containing at least one claim about data of a relational database.

The term "claim" as used herein is also intended to be broadly construed. Thus, a "claim about data of a relational database" need not make explicit reference to any particular relational database, but instead need only generally refer to data that is also part of or otherwise associated with a relational database. For example, a claimant making a "claim about data" through a statement or other assertion in a text summary or other type of text document in some cases need not be aware of the fact that the data is part of one or more relational databases. Numerous alternative claim arrangements are possible.

In some embodiments, the verification platform 102 presents a plurality of ranked potential queries via the user interface module 115, and receives user feedback regarding one or more of the ranked potential queries.

For example, in some embodiments, candidate queries are initially presented to a user via user interface module 115 and feedback from the user is utilized to identify a particular subset of one or more of the candidate queries to be executed. Accordingly, in some embodiments, particular ones of the candidate queries that are subject to evaluation against the relational database are determined based at least in part on user feedback.

The extraction of claim keywords from the text document in text document parsing module 110 in some embodiments more particularly comprises determining a multi-level hierarchical structure of the text document, identifying a claim sentence at a relatively low level of the multi-level hierarchical structure, and extracting one or more claim keywords from each of one or more higher levels of the multi-level hierarchical structure. For example, one or more claim keywords may be extracted from at least one headline in each of the one or more higher levels, such as from one or more paragraphs other than a paragraph that includes the claim sentence. Additionally or alternatively, extracting one or more claim keywords from each of one or more higher levels of the multi-level hierarchical structure includes identifying a paragraph that includes the claim sentence, and extracting one or more claim keywords from each of one or more additional sentences in the paragraph that includes the claim sentence. Such additional sentences can illustratively include a first sentence of the paragraph and a sentence adjacent to the claim sentence in the paragraph.

In some embodiments, the query fragments identified in data set indexing module 111 comprise at least one of aggregation functions, aggregation columns and unary equality predicates of aggregate queries that reference the one or more relational data sets. Other types of query fragments can be used in other embodiments, and terms such as "query fragment" and "relational data set" are therefore also intended to be broadly construed. Query fragments should therefore not be viewed as being limited to the above-noted example query fragments, or to portions of other types of queries explicitly referred to herein. Relational data sets can include any type of data that may be stored in a relational database.

The determination of relevance of the claim keywords to the query fragments in the claim-query matching module 112 in some embodiments comprises identifying matches between the claim keywords and the query fragments, and generating relevance scores based at least in part on the matches, where the relevance scores relate the claim to respective ones of the query fragments. For example, the query fragments may be indexed by sets of keywords, and identifying matches between the claim keywords and the query fragments more particularly comprises querying the indexed query fragments utilizing the claim keywords as queries.

The relevance scores generated based at least in part on the matches are utilized to identify a set of query fragments each having above a specified threshold relevance to the claim. For example, relevance scores in some embodiments are calculated for pairs of claims and query fragments. The higher the relevance score, the more likely the query fragment to be part of the query matching the claim. More particularly, in some embodiments we calculate relevance scores for respective pairs each containing one claim and one query fragment (both the claim and the query fragment are typically associated with multiple keywords). We use information retrieval techniques to do the matching (e.g., we will weigh keywords based on their occurrence frequency and will consider synonyms of keywords, etc.).

The "threshold relevance" noted above can be a threshold based on relevance score, or a threshold based on ranking of query fragments, or another type of threshold based on combinations of these and possibly other factors. The term "threshold relevance" as used herein is therefore intended to be broadly construed. For example, in some embodiments we prune query fragments based on a threshold on the relevance scores, while in other embodiments we rank query fragments for each claim by relevance scores and then consider the top-x fragments in each category (e.g., category predicates, category aggregation functions, etc.) so the threshold is on the rank and not on the relevance score.

In some embodiments, identifying candidate queries based at least in part on probabilistic inferencing from the determined relevance of claim keywords to query fragments in the probabilistic inferencing module 113 more particularly comprises applying relevance scores for a set of query fragments each having above a specified threshold relevance to the claim as input to a probabilistic model, and utilizing the probabilistic model to map the claim to a probability distribution over candidate queries based at least in part on the relevance scores for the set of query fragments.

The probabilistic model implemented by probabilistic inferencing module 113 in some embodiments comprises model parameters representing a document-specific query distribution and latent variables representing respective claim-specific query distributions. Values of the model parameters and a probability distribution of the latent variables of the probabilistic model are iteratively refined in processing multiple claims from one or more text documents.

Additional details regarding the manner in which the processing modules 110, 111, 112, 113, 114 and 115 are configured to implement functionality for verifying text summaries of relational data sets in illustrative embodiments will be described below in conjunction with the embodiments of FIGS. 2 through 9.

Although all of the modules 110, 111, 112, 113, 114 and 115 are shown as being implemented on verification platform 102 in the present embodiment, this is by way of illustrative example only. In other embodiments, one or more of these modules can be implemented on at least one separate processing platform. A given such processing platform is assumed to include at least one processing device comprising a processor coupled to a memory. Examples of such processing devices include computers, servers or other processing devices arranged to communicate over a network such as network 104. Storage devices such as storage arrays or cloud-based storage systems used for implementation of RDBMS 108 and its one or more associated relational databases are also considered "processing devices" as that term is broadly used herein.

It is also possible that at least portions of other system elements such as one or more of the external sources 106 can instead be implemented at least in part as internal components of the verification platform 102, although shown as being separate from the verification platform 102 in the figure.

The verification platform 102 is configured for bidirectional communication with the user terminals 105 over the network 104. For example, images, displays and other outputs generated by the verification platform 102 can be transmitted over the network 104 to user terminals 105 such as, for example, a laptop computer, tablet computer or desktop personal computer, a mobile telephone, or another type of computer or communication device, as well as combinations of multiple such devices. The verification platform 102 also receives input text documents from the external sources 106 over the network 104. The verification platform 102 can additionally or alternatively obtain text documents from other sources, such as various internal sources of the verification platform 102.

The network 104 can comprise, for example, a global computer network such as the Internet, a wide area network (WAN), a local area network (LAN), a satellite network, a telephone or cable network, a cellular network, a wireless network implemented using a wireless protocol such as WiFi or WiMAX, or various portions or combinations of these and other types of communication networks.

In other embodiments, the verification platform 102 need not communicate over a network such as network 104 in verifying text summaries of relational data sets. For example, in alternative embodiments, the verification platform 102 can be configured to perform local fact checking without the need for a network connection.

Examples of automated actions that may be taken in the verification platform 102 responsive to detection of one or more potentially false or otherwise inaccurate claims in one or more text documents obtained from the external sources 106 include reporting such claims over network 104 to at least one of the user terminals 105, generating at least a portion of at least one output display including a visualization of the inaccurate claims in the context of their respective text documents, generating an alert based at least in part on the inaccurate claims for delivery to at least one of the user terminals 105 over the network 104, and storing information characterizing the inaccurate claims in the RDBMS 108. Additional or alternative automated actions may be taken in other embodiments.

The verification platform 102 in the present embodiment further comprises a processor 120, a memory 122 and a network interface 124. The processor 120 is assumed to be operatively coupled to the memory 122 and to the network interface 124 as illustrated by the interconnections shown in the figure.

The processor 120 may comprise, for example, a microprocessor, an application-specific integrated circuit (ASIC), a field-programmable gate array (FPGA), a central processing unit (CPU), an arithmetic logic unit (ALU), a digital signal processor (DSP), or other similar processing device component, as well as other types and arrangements of processing circuitry, in any combination.

As a more particular example, in some embodiments, the processor 120 comprises one or more graphics processor integrated circuits. Such graphics processor integrated circuits are illustratively implemented in the form of one or more graphics processing units (GPUs). Accordingly, in some embodiments, system 100 is configured to include a GPU-based processing platform. A wide variety of other types and arrangements of processing circuitry can be used in other embodiments.

The memory 122 stores software program code for execution by the processor 120 in implementing portions of the functionality of the verification platform 102. For example, at least portions of the functionality of the modules 110, 111, 112, 113, 114 and 115 can be implemented using program code stored in memory 122.

A given such memory that stores such program code for execution by a corresponding processor is an example of what is more generally referred to herein as a processor-readable storage medium having program code embodied therein, and may comprise, for example, electronic memory such as SRAM, DRAM or other types of random access memory, flash memory, read-only memory (ROM), magnetic memory, optical memory, or other types of storage devices in any combination.

Articles of manufacture comprising such processor-readable storage media are considered embodiments of the invention. The term "article of manufacture" as used herein should be understood to exclude transitory, propagating signals.

Other types of computer program products comprising processor-readable storage media can be implemented in other embodiments.

In addition, embodiments of the invention may be implemented in the form of integrated circuits comprising processing circuitry configured to implement processing operations associated with one or more of the modules 110, 111, 112, 113, 114 and 115, as well as other related functionality.

The network interface 124 is configured to allow the verification platform 102 to communicate over one or more networks with other system elements, and may comprise one or more conventional transceivers.

It is to be appreciated that the particular arrangement of components and other system elements shown in FIG. 1 is presented by way of illustrative example only, and numerous alternative embodiments are possible. For example, other embodiments of information processing systems can be configured to provide automated claim verification functionality of the type disclosed herein.

Figure 2:
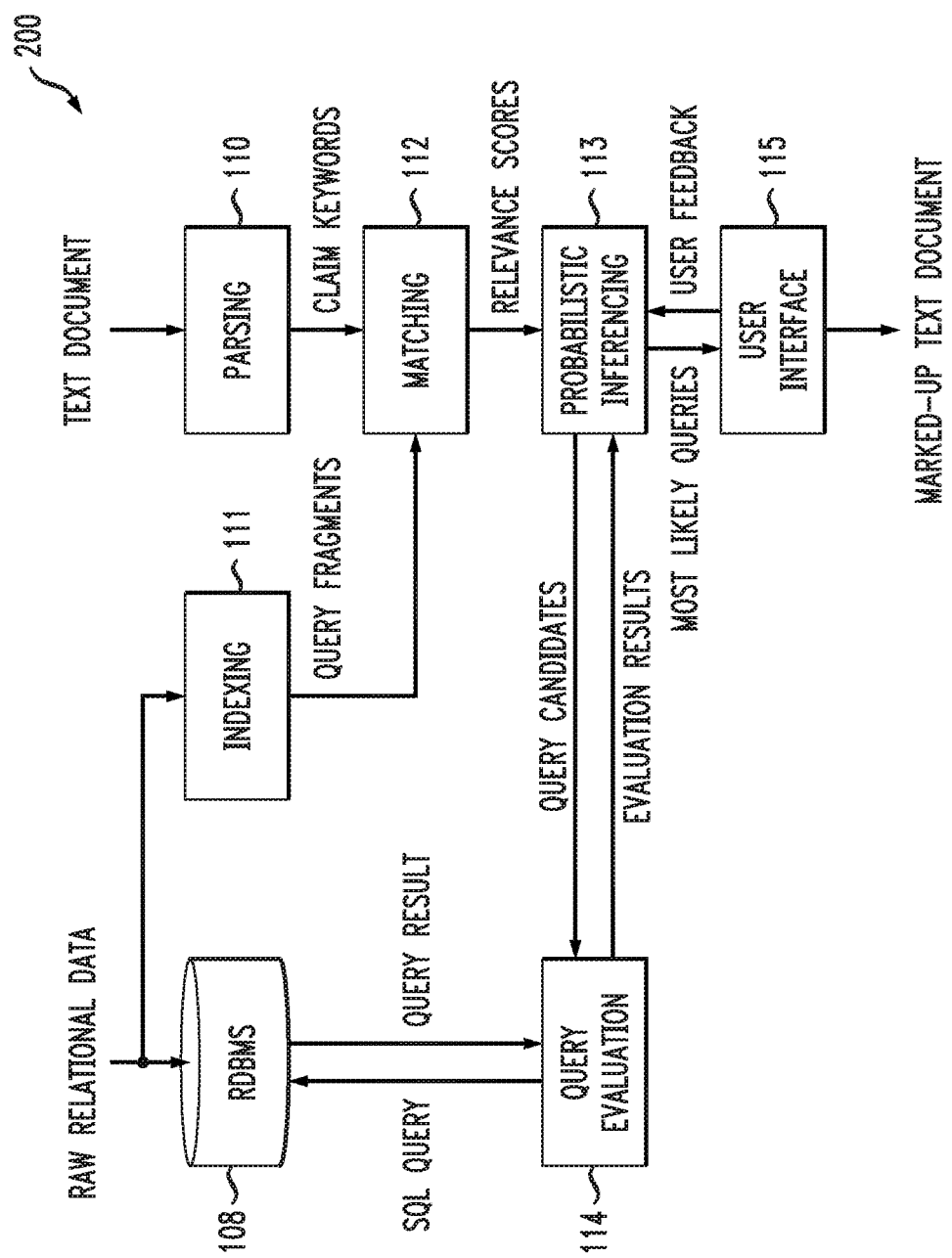
FIG. 2 illustrates an example process flow for verifying text summaries of relational data sets in the system of FIG. 1.

FIG. 2 illustrates the operation of an example process 200 implemented by the modules 110 through 115 of the verification platform 102 through interaction with the RDBMS 108 in one embodiment.

In this embodiment, a text document is subject to parsing operations in the text document parsing module 110 to extract claim keywords. Raw relational data of a relational database managed by the RDBMS 108 is indexed in the data set indexing module 111 to obtain query fragments. The extracted claim keywords and the query fragments are applied to the claim-query matching module 112 to generate relevance scores for respective claim-query pairs. The relevance scores are applied to the probabilistic inferencing module 113 which determines query candidates for submission by the query evaluation module 114 to the RDBMS 108 for evaluation against the relational database. The queries submitted by the query evaluation module 114 are illustratively structured query language (SQL) queries, although other types of queries implemented using other query languages can be used in other embodiments. Query results are returned by the RDBMS 108 to the query evaluation module 114, which in turn provides evaluation results back to the probabilistic inferencing module 113. The probabilistic inferencing module 113 in determining the candidate queries provided to the query evaluation module 114 illustratively presents a set of most likely queries to a user via the user interface module 115, and receives user feedback regarding the most likely queries. The user feedback can be used, for example, to identify one or more particular candidate queries. The user interface module 115 is also used to present a marked-up text document to the user, with an indication of the determined consistency between the claim and the data of the relational database.

Additional aspects of the process 200 will be described in greater detail below with reference to FIGS. 3 through 9.

For example, pseudocode used to implement portions of the process 200 of FIG. 2 as described above are shown in FIGS. 5, 6, 7 and 9, and also referred to herein as Algorithm 1, Algorithm 2, Algorithm 3 and Algorithm 4, respectively. However, these particular pseudocode arrangements are presented by way of illustrative example only, and should not be construed as limiting in any way.

Illustrative embodiments representing possible implementations of the system 100 and process 200 of FIGS. 1 and 2 include exemplary implementations comprising a verification tool referred to herein as "AggChecker." References herein to AggChecker should therefore be understood to refer to one or more illustrative embodiments, and a wide variety of different AggChecker embodiments can be configured based on the teachings provided herein. AggChecker in some embodiments is in the form of a processor-implemented verification tool that provides a natural language query interface for verification of claims involving text summaries of relational data sets. AggChecker illustratively focuses on natural language claims that translate into an SQL query and a claimed query result. AggChecker in such embodiments more particularly focuses on claims that are translated into aggregation queries on data subsets. We have determined that this claim type is not only very common in practice, but is also prone to inconsistencies with corresponding relational data sets.

AggChecker illustratively marks up text passages that seem to be inconsistent with the corresponding relational data sets. It utilizes a probabilistic model that is configured to reason about an input document in a holistic fashion. Based on claim keywords and the document structure, it maps each text claim to a probability distribution over associated query translations. By efficiently executing tens to hundreds of thousands of candidate translations for a typical input document, AggChecker maps text claims to correctness probabilities. This process becomes practical via a specialized processing backend, avoiding redundant work via query merging and result caching. Verification in some embodiments is implemented in the form of an interactive process in which users are shown tentative results, enabling them to take corrective actions if necessary.

Relational data is often summarized by text. Examples range from newspaper articles by data journalists to experimental papers summarizing tabular results. Illustrative embodiments focus on verifying, in an automated fashion, whether text claims are consistent with the actual database. For example, AggChecker embodiments can help text authors (e.g., a business analysts summarizing a relational data set with sales) to polish their text before publication. Additionally or alternatively, AggChecker embodiments can enable users to verify text written by third parties (e.g., a lector could check an article before publication). AggChecker can be adapted for use in numerous other verification contexts.

AggChecker has been tested on a set of 53 public articles containing 392 claims. The test cases included articles from major newspapers, summaries of survey results, and Wikipedia articles. This testing revealed erroneous claims in roughly a third of test cases. A detailed user study shows that users utilizing AggChecker are on average six times faster at checking text summaries, compared to generic SQL interfaces. In fully automated verification, AggChecker achieves significantly higher precision and recall than baselines from the areas of natural language query interfaces and fact-checking. Other embodiments provide similar advantages relative to conventional approaches.

FIG. 3 provides an example showing the operation of AggChecker in an illustrative embodiment. This figure includes six distinct portions, including FIG. 3(a) showing raw relational data, FIG. 3(b) showing a portion of a text document comprising a paragraph with two sentences, FIG. 3(c) showing query fragments and associated keywords, FIG. 3(d) showing extracted claim keywords and their respective weights, FIG. 3(e) showing a probability distribution and evaluation results for query candidates, and FIG. 3(f) showing changing priors during expectation-maximization iterations until convergence.

With reference to FIG. 3(b), the portion of the text document being analyzed in this example comprises the passage "There were only four previous lifetime bans in my database —three were for repeated substance abuse" taken from a newspaper article. This passage, which represents an example of a multiple-sentence paragraph as those terms are broadly used herein, contains two claims that translate into the SQL queries SELECT COUNT(*) FROM NFLSUSPENSIONS WHERE GAMES='INDEF' (with claimed result "four") and SELECT COUNT(*) FROM NFLSUSPENSIONS WHERE GAMES='INDEF' AND CATEGORY='SUBSTANCE ABUSE, REPEATED OFFENSE' (with claimed result "three") on the associated data set. The goal in this illustrative embodiment is to automatically translate text to queries, to evaluate those queries, and to compare the evaluation result against the claimed one.

Internally, the system in some embodiments executes the following, simplified process to verify a claim. First, it tries to translate the natural language claim into at least one SQL query reflecting its semantics. Second, it executes the corresponding query or queries on the relational database. More particularly, in some embodiments, multiple possible translations for the same claim result in multiple candidate queries that are executed on the relational database, since the system is unsure as to which translation is the correct one. Third, it compares each query result against the value claimed in text. If the query result rounds to the text value then the claim has been verified. Otherwise, the claim is considered erroneous. Color markup or other type of markup can be used to indicate the verification result to users. Additionally, users may obtain information on the verification process and can take corrective actions if necessary (similar to how users correct erroneous spell checker markup).

A challenge in embodiments of this type is the translation of a natural language claim into an SQL query. There has been a recent surge in research on natural language query interfaces, and illustrative embodiments disclosed herein provide considerable advances over existing approaches in that space. In this regard, it is important to appreciate the differences between natural language querying (NLQ) and natural language claim-to-query translation (CTQ). In case of NLQ, the input is a single natural language query. In illustrative embodiments herein, we use as input an entire hierarchical text document containing multiple related claims. Typical NLQ approaches output a single result query (whose result is presented to the user). In illustrative embodiments herein, we map each claim to a probability distribution over corresponding SQL queries. As discussed in more detail below, we can calculate correctness probabilities for a given claim based on the latter distribution.

Such embodiments in some cases are advantageously configured to provide a verification system that works "out of the box" for a new input text and database. We do not assume that training samples are available for a given database. We also do not require users to annotate data by hand to enable claim-to-query translation.

These features make it very hard to translate claims to queries. Among the challenges we encountered when studying real-world test cases are the following. First, the claim sentence itself is often missing required context. This context can only be found by analyzing preceding paragraphs or headlines (assuming a hierarchical input text document). Second, claim sentences often contain multiple claims which make it hard to associate sentence parts to claims. Third, claim sentences are often long and contain parts which do not immediately correspond to elements in the associated query. This makes it hard to map the claim sentence parse tree to a similar SQL query tree. Fourth, data sets often contain entries (e.g., abbreviations) that are not found immediately in the claim text. Altogether, this makes it hard to map claim sentences unambiguously to database elements. Illustrative embodiments utilize the following approaches to cope with those challenges.

1. Accept Uncertainty. Typical natural language query interfaces need to produce a single query. For us, it is sufficient to know that none of the likely query candidates evaluates to a claimed result value. Hence, our system still works even if we cannot precisely translate specific text claims.

2. Exploit Semantic Correlations. Claims in the same input text are often semantically correlated. Hence, they translate into queries with similar characteristics. We exploit that fact by learning, via an iterative expectation-maximization approach, a document-specific prior distribution over queries (also called "topic" in the following description). We integrate priors when selecting likely query candidates as translations.

3. Exploit Claim Results. We are given a query description as well as a query result. In practice, accurate claims are more likely than inaccurate claims. Hence, we consider a match between query result and claimed result a strong (but not decisive) signal, increasing the likelihood of that query candidate. As we share knowledge between different claims (see the previous point), a clear signal received for one claim ideally resolves ambiguities for many others.

4. Perform Massive-Scale Query Evaluations. To leverage those signals, we evaluate candidate queries at a massive scale in some embodiments. Candidates are formed by combining relevant query fragments (such as aggregation functions, columns, and predicates). Query fragments are generated via a keyword-based high-recall heuristic by comparing database entries and claim keywords. We routinely evaluate ten thousands of query candidates per claim. To make this approach practical, we use an execution engine that merges execution of similar queries (among several other techniques) to increase efficiency.

Additionally or alternatively, some embodiments rely on the user to take corrective actions (e.g., the system is used in semi-automated instead of fully automated verification mode). The benefit of using the system is then similar to the benefit of using a spell checker. AggChecker resolves most cases and allows users to focus on difficult cases, thereby saving time in verification. We evaluated our system on a variety of real-world test cases, containing 392 claims on relational data sets. Our test cases cover diverse topics and derive from various sources, reaching from Wikipedia to New York Times articles. We generated ground truth claim translations by hand and contacted the article authors in case of ambiguities. We identified a non-negligible number of erroneous claims, many of which are detected by our system. We compared against baseline systems and performed a user study. The user study demonstrates that users verify documents significantly faster via AggChecker than via standard query interfaces.

We will now introduce our problem model and related terminology for further describing illustrative embodiments. We generally assume a scenario where we have a relational database together with a natural language text summarizing it. The relational database might be optionally associated with a data dictionary (mapping database elements such as columns and values to text descriptions). The text document may be semi-structured, e.g., organized as a hierarchy of sections and subsections with associated headlines. Also, the text contains claims about the data of the relational database.

A "claim" in illustrative embodiments is defined as a word sequence from the input text stating that evaluating a query q on the associated database D yields a rounded result e, although other types of claims can be processed in other embodiments. We focus on SQL queries with numerical results ($e \in \mathbb{R}$). We call q also the "matching query" or "ground truth query" with regards to the claim. A claim may be a sentence part or a sentence (one sentence may contain multiple claims). The term "sentence" as used herein is intended to be broadly construed so as to encompass, for example, arrangements such as those illustrated in FIG. 3(b) and FIG. 3(d). A claim is considered "correct" if there is an admissible rounding function $\rho: \mathbb{R} \to \mathbb{R}$ such that the rounded query results equals the claimed value (i.e., $\rho(q(D))=e$).

In the approach described below, we consider rounding to any number of significant digits as admissible. The approach described below can be used with different rounding functions as well.

We focus on what we refer to herein as "simple aggregate queries," a class of claim queries defined as below, although it is to be appreciate that other types of claims and queries can be used in other embodiments.

A "simple aggregate query" in illustrative embodiments is defined as an SQL query of the form SELECT FCT(AGG) FROM T1 E-JOIN T2 . . . WHERE C1=V1 AND C2=V2 AND . . . , calculating an aggregate over an equi-join between tables connected via primary key-foreign key constraints. The where clause is a conjunction of unary equality predicates.

Claims of this format are very popular in practice and at the same time error-prone. Examples of aggregation functions utilized in illustrative embodiments include: COUNT, COUNT DISTINCT, SUM, AVERAGE, MIN, MAX, PERCENTAGE, and CONDITIONAL PROBABILITY. For conditional probability, we assume that the first predicate is the condition and the rest form the event. That is, (SELECT CONDITIONALPROBABILITY (AGG) FROM T1 E-JOIN T2 . . . WHERE C1=V1 AND C2=V2 AND . . . )=(SELECT COUNT(AGG) FROM T1 E-JOIN T2 . . . WHERE C1=V1 AND C2=V2 AND . . . )*100/(SELECT COUNT(AGG) FROM T1 E-JOIN T2 . . . WHERE C1=V1). Additional or alternative aggregation functions can be used in other embodiments. For example, alternative embodiments can be configured to perform purely automatic aggregate-checking (e.g., given a text document and a database, identify claims automatically and decide for each one whether it is correct), although such embodiments would generally require enhanced (e.g., near-perfect) natural language understanding which may be unduly difficult to achieve in practice. Accordingly, some illustrative embodiments disclosed herein perform semi-automatic aggregate checking in which user feedback is utilized.

Given input $\langle T, D \rangle$, comprising a text T and a database D, the goal of semi-automatic aggregate-checking in illustrative embodiments is to identify claims and to map each claim c to a probability distribution $Q_c$ over matching queries. This probability distribution can be exploited by a corresponding user interface to quickly verify text in interaction with the user. The quality of a corresponding approach can be measured based on how often the top-x likely query candidates in $Q_c$ contain the matching query.

The above definitions relate to features of illustrative embodiments, and need not apply to other embodiments. Accordingly, different definitions can be applied in other embodiments, and such definitions should not be viewed as limitations.

As previously described in conjunction with FIG. 2, the input to AggChecker illustratively comprises a relational data set and a text document, optionally enriched with HTML markup highlighting the text structure. The text contains claims about the data. AggChecker is configured to translate natural language claims into pairs of SQL queries and claimed query results. The process in this embodiment is semi-automated and utilizes user feedback to resolve ambiguities. Finally, we enrich the input text with visual markup, identifying claims that are inconsistent with the data.

For each newly uploaded data set, we first identify relevant query fragments (see FIG. 3(c)). The system focuses on simple aggregate queries as defined previously. Query fragments include aggregation functions, aggregation columns, or unary equality predicates that refer to columns and values in the data set. We associate each query fragment with keywords, using names of identifiers within the query fragment as well as related keywords that we identify using WordNet. We index query fragments and the associated keywords via an information retrieval engine (e.g., Apache Lucene).

Next, we parse the input text using natural language analysis tools such as the Stanford parser. We identify potentially check-worthy text passages via simple heuristics and rely on user feedback to prune spurious matches. Then, we associate each claim with a set of related keywords (see FIG. 3(d)). We use dependency parse trees as well as the document structure to weight those keywords according to their relevance. We query the information retrieval engine, indexing query fragments, using claim keywords as queries. Thereby we obtain a ranked set of query fragments for each claim.

Query fragments with relevance scores form one out of several inputs to a probabilistic model. This model maps each text claim to a probability distribution over SQL query candidates, representing our uncertainty about how to translate the claim (see FIG. 3(e)). The model considers the document structure and assumes that claims in the same document are linked by a common theme. The document theme is represented via model parameters capturing the prior probabilities of certain query properties. We infer document parameters and claim distributions in an iterative expectation-maximization approach. Furthermore, we try to resolve ambiguities in natural language understanding via massive-scale evaluations of query candidates. AggChecker uses evaluation strategies such as query merging and caching to make this approach practical (e.g., Postgres is used to evaluate merged queries). We typically evaluate several tens of thousands of query candidates to verify one newspaper article.

As mentioned previously, FIG. 3 provides a concrete running example demonstrating the inputs and outputs of the main components. FIG. 3(a) depicts the raw relational data where query fragments and their associated keywords are extracted as in FIG. 3(c). FIG. 3(b) illustrates a text passage from a newspaper article. It contains three claimed results (shown as shaded in the figure) where we focus on the claimed result "one" in this example. In FIG. 3(d), we extract relevant keywords for this claimed result and weigh them based on the text structure. Then, we calculate relevance scores for pairs of claims and query fragments (e.g., each pair including one claim and one query fragment) based on their keywords. The probabilistic model takes into account the relevance scores as well as two other inputs to infer the probability distribution over query candidates. FIG. 3(e) captures this concept. First, "Keyword Probability" is derived from the relevance scores. Second, "Prior Probability" encapsulates the model parameters that embrace all claims in the text document in a holistic fashion. Third, different shadings (e.g., implemented as green or red colors in practice) under "Evaluation Result" show whether the query result matches the value claimed in text. More particularly, the evaluation result for the first query candidate in this table has a particular shading (e.g., a green color in practice) that indicates a match between the query result and the claimed result, while the evaluation results for the other query candidates have a different shading (e.g., a red color in practice) that indicates the opposite, specific to the claim result "one." Lastly, "Refined Probability" illustrates the final probability distribution over query candidates, considering all three inputs. After expectation-maximization iterations have converged, the system verifies the claim according to the query with the highest probability. We provide more detailed explanations elsewhere herein with reference to this figure.

Figure 4:
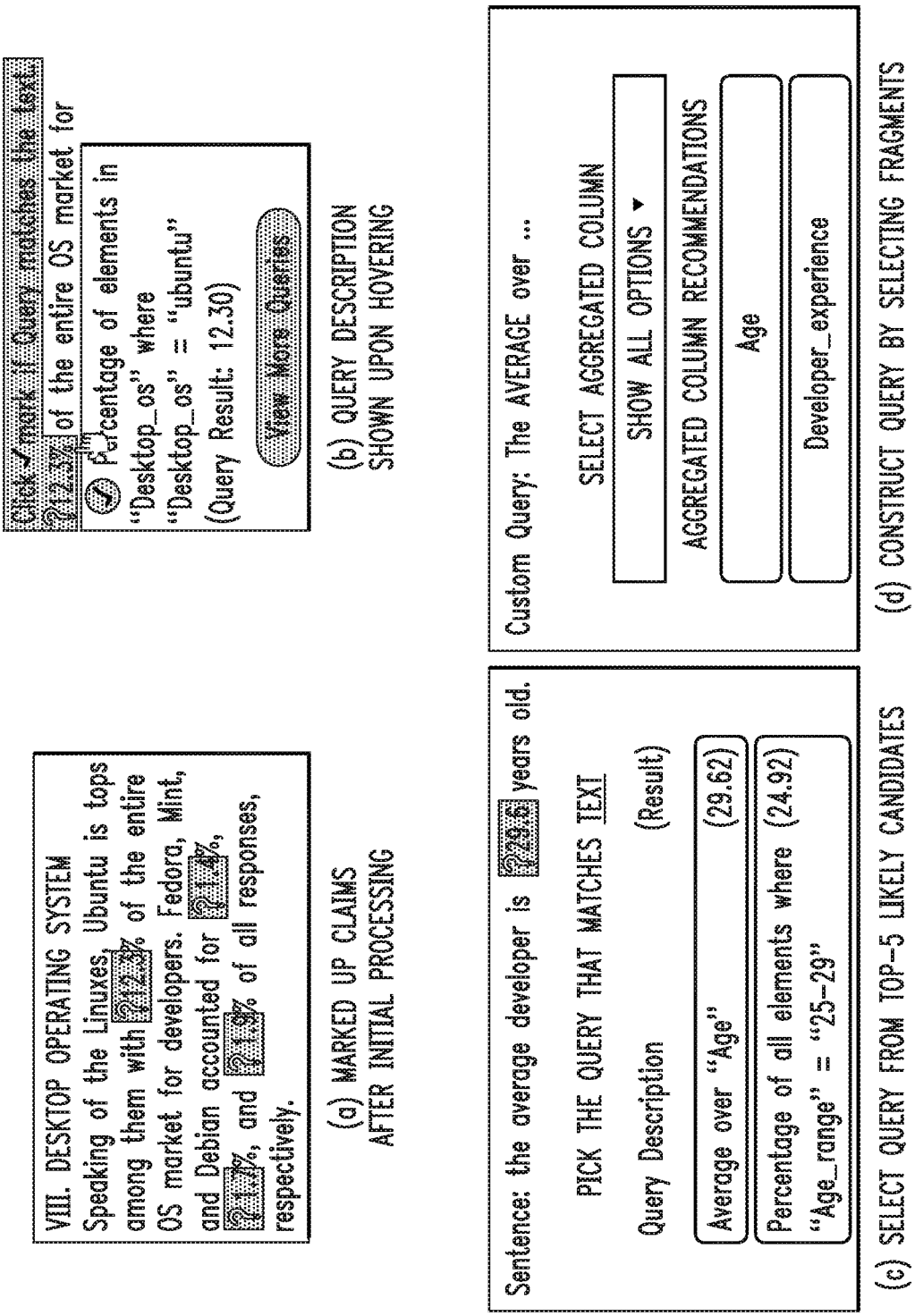
FIG. 4 is a multi-part figure showing examples of screenshots of a user interface in an illustrative embodiment.

FIG. 4 shows examples of screenshots from a user interface of AggChecker in an illustrative embodiment. After an automated verification stage, the system shows tentative verification results to the user. Claims are shaded, colored or otherwise highlighted based on their probability of being erroneous (see FIG. 4(a)). Users can hover over a claim to see a natural language description of the most likely query translation (see FIG. 4(b)) and may correct the system if necessary. Alternatively, users may pick among the top-k most likely query candidates (see FIG. 4(c)) or assemble the query from query fragments with high probability (see FIG. 4(d)). Other types of user interface arrangements can be used in other embodiments.

Additional details regarding keyword matching in Agg-Checker will now be described. In a first processing phase, we extract query fragments and claim keywords from the inputs and match them together to calculate relevance scores.

We calculate relevance scores for pairs of claims and query fragments. The higher the relevance score, the more likely the fragment to be part of the query matching the claim. We consider aggregation functions, aggregation columns, and predicate parts as query fragments. Given an input database, we can infer all potentially relevant query fragments (e.g., we introduce an equality predicate fragment for each literal in the database, an aggregation column fragment for each column containing numerical values, etc.). Furthermore, we can associate query fragments with relevant keywords (e.g., the name of a literal, as well as the name of the containing column and synonyms for a fragment representing an equality predicate).

On the other side, we can associate each claim in the input text with relevant keywords, based on the document structure. Having query fragments and claims both associated with keyword sets, we can use methods from the area of information retrieval to calculate relevance scores for specific pairs of claims and query fragments. For instance, we use Apache Lucene in some implementations, indexing keyword sets for query fragments and querying with claim-specific keyword sets. While keyword-based relevance scores are inherently imprecise, they will form one out of several input signals for the example probabilistic model to be described in detail below. The latter model will associate each claim with a probability distribution over query candidates.

FIG. 5 shows pseudocode for Algorithm 1, an example process by which relevance scores are calculated. It relies on sub-functions for indexing query fragments derived from the database (function INDEXFRAGMENTS) and for extracting keyword sets for claims (function CLAIMKEYWORDS).

Indexing of query fragments is illustratively performed in the following manner. When loading a new database, we first form all potentially relevant query fragments. Function INDEXFRAGMENTS (we describe its implementation without providing pseudocode) traverses the database in order to form query fragments that could be part of a claim query. We consider three types of query fragments: aggregation functions, aggregation columns, and equality predicates. All aggregation functions specified in the SQL standard, and possibly others, are potentially relevant (e.g., we could easily add domain-specific aggregation functions). We consider all numerical columns in any table of the database as aggregation columns (in addition, we consider the "all column" * as argument for count aggregates). Finally, we consider all equality predicates of the form c=v where c is a column and v a value that appears in it.

We associate each query fragment with a set of relevant keywords. Keyword sets are indexed via an information retrieval engine (together with a reference to the corresponding fragment). We associate each standard SQL aggregation function with a fixed keyword set. The keywords for aggregation columns are derived from the column name and the name of its table.

Column names are often concatenations of multiple words and abbreviations. We therefore decompose column names into all possible substrings and compare against a dictionary. Furthermore, we use WordNet to associate each keyword that appears in a column name with its synonyms. The keywords for an equality predicate of the form c=v are derived from the column name c (and from the name of the containing table) as well as from the name of value v. Finally, AggChecker also offers a parser for common data dictionary formats. A data dictionary associates database columns with additional explanations. If a data dictionary is provided, we add for each column the data dictionary description to its associated keywords.

We extract keywords from text in the following manner. We associate each claim in the input text with a weighted set of keywords. More precisely, we iterate over each number in the input text that is likely to represent a claimed query result. We describe below how such identification is performed.

FIG. 6 shows pseudocode of Algorithm 2, an example process for associating each such claim with weighted keywords, extracted from the containing text. First, we consider keywords in the claim sentence itself (i.e., the sentence in which the claimed result number is found). One sentence might contain multiple claims and we must decide what keywords are most relevant to one specific claim. For that, we construct a dependency parse tree of the claim sentence. We make the simplifying assumption that sentence parts are more closely related, the lower their distance (i.e., number of tree edges to traverse) is in the parse tree. Hence, for each numerical aggregate representing the result of a claim, we weight the surrounding keywords based on their distance from the numerical aggregate in the dependency tree (denoted by TREEDISTANCE in Algorithm 2).

Considering keywords in the same sentence is often insufficient. In practice, relevant context is often spread over the entire text. We exploit the structure of the text document in order to collect potentially relevant keywords. Some implementations use HTML markup but the document structure could be easily derived from the output format of any word processor. We assume that the document is structured hierarchically into multiple levels. For example, the hierarchy in some embodiments includes documents at the highest level, following in decreasing order by sections, subsections, paragraphs and finally sentences, including claim sentences, at a lowest level of the hierarchy. The various levels of the hierarchy represent keyword sources utilized to provide keyword context for a claim sentence. For a given claim sentence, we "walk up" that hierarchy and add keywords in all headlines we encounter. In addition, we add keywords from the first and preceding sentences in the same paragraph.

Referring again to the example of FIG. 3(b), it is assumed that the portion of the text document shown represents a paragraph with two sentences, including a claim sentence in the second part of the paragraph and a previous sentence in the first part of the paragraph. The claim sentence, which is the second sentence of the paragraph in this example, contains two claimed results ("three" and "one") that translate into queries of the form: SELECT COUNT(*) FROM T WHERE GAMES='INDEF.' AND CATEGORY=V. We illustrate two difficulties associated with these claims.

First, there are two claims in one sentence. The system needs to distinguish keywords that are more relevant to each claim. Let's consider the keyword "gambling." According to the dependency parse tree of the second sentence, the distance from "three" to "gambling" is two while the distance from "one" to "gambling" is one. Then, we assign weights by taking the reciprocal of the distance (see FIG. 3(d)). This helps the system to understand that "gambling" is more related to "one" than "three."

Second, no keyword in the second sentence explicitly refers to the restriction GAMES='INDEF'. Rather, it can be implicitly inferred from the context where only the first sentence has the keywords "lifetime bans." Thereby, considering the keyword context of a claim sentence enables us to identify important and relevant keywords from other parts of the text. Experimental results show that the effect of utilizing such keyword context can be advantageous in illustrative embodiments.

The construction of likely query candidates then proceeds as follows. Having associated both query fragments and claims with keywords, we can map claims to likely query candidates. We indexed keyword sets associated with query fragments in an information retrieval engine. For a given claim, we use the associated keyword set to query that information retrieval engine. The returned results correspond to query fragments that are associated with similar keywords as the claim. Furthermore, each returned query fragment is associated with a relevance score, capturing how similar its keywords are to the claim-related keywords. Combining all returned query fragments in all possible ways (within the boundaries of the query model described elsewhere herein) yields the space of claim-specific query candidates. Each candidate is characterized by a single aggregation function fragment, applied to an aggregation column fragment, in the SQL select clause. In addition, each candidate is characterized by a set of unary equality predicates that we connect via a conjunction in the SQL where clause. The SQL from clause can be easily inferred from the other query components: it contains all tables containing any of the columns referred to in aggregates or predicates. We connect those tables via equi-joins along foreign-key-primary-key join paths.

The probabilistic model utilized in illustrative embodiments will now be described in further detail.

As mentioned previously, we map each natural language claim to a probability distribution over matching SQL queries. Based on the most likely candidate query or set of candidate queries for each claim, we can decide which claims are likely to be wrong and focus the user's attention on those.

The probabilistic model is configured to exploit a fundamental property of typical text documents, namely, that text summaries tend to have a primary focus. The claims made in a text are not independent from each other but typically connected via a common theme. If we find out the common theme, mapping natural language claims to queries becomes significantly easier.

We represent the common theme as a document-specific probability distribution over queries. We use that distribution as a prior when inferring likely queries for each claim. Beyond the prior distribution, the likelihood of queries depends on the keyword-based relevance scores that are associated with each claim (we describe how those relevance scores can be calculated below).

We face a circular dependency: if we had the document theme, we could use it as prior in our search for the most likely query for each claim. On the other side, if we had the most likely query for each claim, we could infer the document theme. Accordingly, illustrative embodiments utilize an expectation-maximization approach in which model parameters (describing the document-specific query distribution) and values of latent variables (describing claim-specific query distributions) are iteratively refined, using tentative values for one of the two to infer estimates for the other.

FIG. 7 shows pseudocode for Algorithm 3, and example process for learning a document-specific probability distribution over queries and refining it by evaluating query candidates. More particularly, Algorithm 3 describes how the AggChecker infers probability distributions over query candidates. Starting from a uniform document distribution (captured by parameter $\Theta$ whose precise components are described in the following), the algorithm iterates until convergence. In each iteration, a claim-specific probability distribution over query candidates is calculated for each claim, based on the relevance scores provided as input and the model parameters.

Strong evidence that a query candidate matches a natural language claim can be obtained by evaluating the query and comparing its result to the claimed one. However, evaluating queries on potentially large data sets may lead to significant processing overheads. Myriads of queries are possible for a given data set and we cannot execute all of them. This is why we use a preliminary, claim-specific query distribution to select promising query candidates for execution. In further description below, we describe efficient processing strategies enabling us to execute hundreds of thousands of query candidates during learning. The evaluation of promising candidates is encapsulated in function REFINEBYEVAL in Algorithm 3. The result is a refined probability distribution over query candidates for a given claim that takes evaluation results into account. Finally, the model parameters are updated based on the claim-specific distributions.

In the following description, we provide additional details on the exemplary probabilistic model outlined above, although it is to be appreciated that other probabilistic models can be used in other embodiments.

Figure 8:
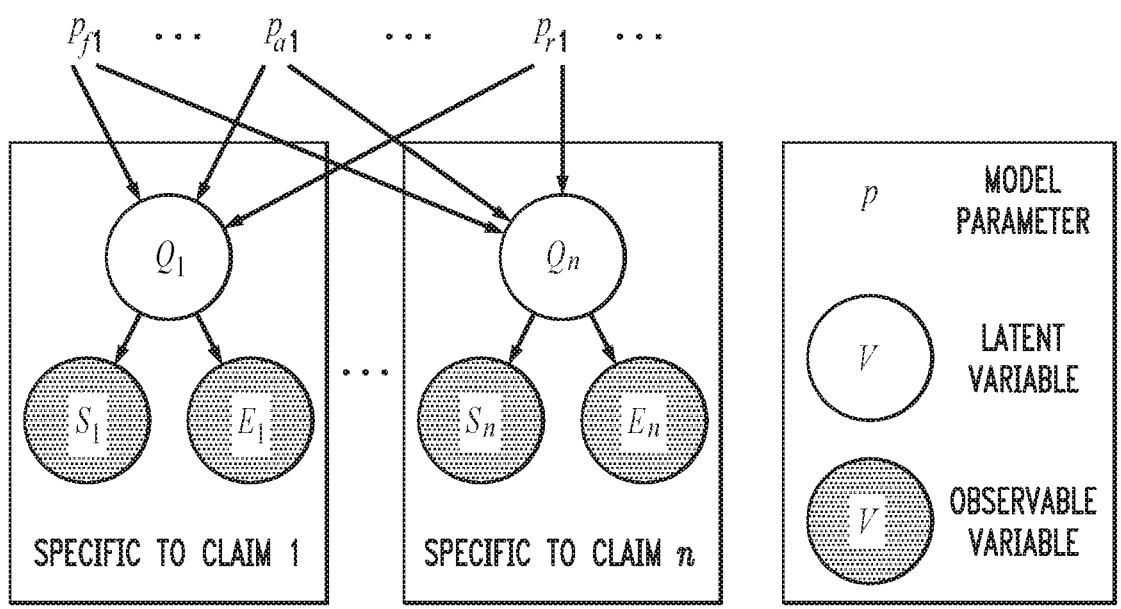
FIG. 8 shows one possible probabilistic model utilized for query inferencing in an illustrative embodiment.

FIG. 8 shows a simplified view of the probabilistic model for query inference in an illustrative embodiment. In this probabilistic model, parameters describe prior probabilities of query characteristics, claim queries ($Q_c$) are latent while relevance scores ($S_c$) and evaluation results ($E_c$) are observable.

We keep the model relatively simple in this embodiment, as having more parameters to learn typically requires a higher number of iterations until convergence. In our case, each iteration requires expensive data processing and hence we configure the model to avoid an elevated number of steps. We therefore introduce only parameters that describe the probability of certain coarse-grained query features:

$$\Theta = \langle p_{f1}, p_{f2}, \ldots, p_{a1}, p_{a2}, \ldots, p_{r1}, p_{r2}, \ldots \rangle \quad (1)$$

Here, $p_{fi}$ is the prior probability of selecting the i-th aggregation function (such as an average or a sum), $p_{ai}$ is the probability of selecting the i-th numerical column to aggregate, and $p_{ri}$ is the probability that a restriction (i.e., equality predicate) is placed on the i-th column. We can only have a single aggregation function and a single column to aggregate over, the corresponding parameters must therefore sum up to one. This does not apply to the parameters describing the likelihood of a restriction as a query might restrict multiple columns at the same time. During the maximization step of Algorithm 3 (line 17), we simply set each component of $\Theta$ to the ratio of maximum likelihood queries with the corresponding property, scaled to the total number of claims in the document. For instance, for updating $r_i$, we divide the number of maximum likelihood queries (summing over all claims) placing a restriction on the i-th column by the number of claims.

Referring back to the example of FIG. 3, the convergence of priors $\Theta$ for that example is shown in FIG. 3(f). Note that all three claims in this example have ground truth queries of the form: SELECT COUNT(*) FROM T WHERE GAMES='INDEF' (AND CATEGORY=V). In FIG. 3(f), priors successfully reflect this pattern after several EM iterations. For instance, the final priors imply the fact that a query with COUNT(*) is more likely to be the correct one among query candidates. Experimental results indicate that the system significantly benefits from the prior probabilities.

Next, we show how to calculate claim-specific probability distributions over queries, assuming given values for the parameters above. We introduce random variable $Q_c$ to model the query described in claim c. Hence, $Pr(Q_c=q)$ is the probability that the text for claim c describes a specific query q. Variable $Q_c$ depends on another random variable, $S_c$, modeling relevance scores for each query fragment. Those relevance scores are generated by an information retrieval engine, as described previously, based on keywords in claim text. If a query fragment has high relevance scores (i.e., many related keywords appear in the claim), the probability of $Q_c$ for queries containing that fragment increases. Also, if a query evaluates to the claimed result, the probability that the claim describes this query should intuitively increase. We model by $E_c$ evaluation results for a set of promising query candidates and $Q_c$ depends on $E_c$. According to the Bayes rule, we obtain:

$$Pr(Q_c|S_c,E_c) \propto Pr(S_c \wedge E_c|Q_c) \cdot Pr(Q_c) \quad (2)$$

$Pr(Q_c)$ denotes prior query probabilities, derived from a document-specific theme. Assuming independence between relevance scores and evaluation results, we obtain:

$$Pr(S_c \wedge E_c|Q_c) = Pr(S_c|Q_c) \cdot Pr(E_c|Q_c) \quad (3)$$

We assume independence between different query characteristics. This is a simplification (as certain aggregation functions might often be used with certain aggregation columns for instance), but modeling dependencies would require additional parameters and our prior remark about model complexity applies. Via independence assumptions, we obtain:

$$Pr(S_c|Q_c) = Pr(S_c^F|Q_c) \cdot Pr(S_c^A|Q) \cdot Pr(S_c^R|Q_c) \quad (4)$$

Variable $S_c^F$ represents the relevance scores assigned to each aggregation function by the information retrieval engine, based on keywords surrounding claim c. By $S_c^A$, we denote relevance scores for aggregation columns, and by $S_c^R$ scores for query fragments representing restrictions (i.e., equality predicates). The probability $Pr(S_c^A|Q_c)$ is for instance the probability that we obtain relevance scores $S_c^A$, assuming that the text author describes query $Q_c$ in claim c. Obtaining a high relevance score for a query fragment (be it aggregation function, column, or predicate) means that related keywords appear prominently in the claim text. Hence, query fragments that are part of the claim query should tend to receive higher relevance scores than the others.

We use a simple model that complies with the latter intuition: the probability to receive certain relevance scores is proportional to the relevance scores of the fragments appearing in the claim query. For example, assume that claim query q aggregates over column $a \in A$ (where A designates the set of all candidate columns for aggregates in the database). We denote by $S_c^A(\alpha)$ the relevance score for the query fragment representing that specific column a. We set $Pr(S_c^A|Q_c=a) = S_c^A(\alpha)/\Sigma_{\alpha \in A} S_c^A$, scaling relevance scores to the sum of relevance scores over all query fragments in the same category (i.e., aggregation columns in this case).

Correct claims are more likely than incorrect claims in typical text documents. Hence, if a query candidate evaluates to the claimed value, it is more likely to be the query matching the surrounding text. It is typically not feasible to evaluate all candidate queries on a database. Hence, we restrict ourselves to evaluating queries that have high probabilities based on relevance scores alone (line 14 in Algorithm 3). Let $E_c$ be the evaluation results of promising queries for claim c. We set $Pr(E_c|Q_c=q)=p_T$ if the evaluations $E_c$ map query q to a result that rounds to the claimed value. We set $Pr(E_c|Q_c=q)=1-p_T$ otherwise. Parameter $p_T$ is hence the assumed probability of encountering true claims in a document. Different settings realize different tradeoffs between precision and recall.

We finally calculate prior query probabilities, assuming again independence between different query characteristics:

$$Pr(Q_c) = Pr(Q_c^F) \cdot Pr(Q_c^A) \cdot \Pi_{r \in R} Pr(Q_c^r) \quad (5)$$

The prior probabilities of specific aggregation functions ($Pr(Q_c^F)$), aggregation columns ($Pr(Q_c^A)$), and restrictions ($Pr(Q_c^r)$) follow immediately from the model parameters θ. In summary, let q be an SQL function with aggregation function $f_q$ and aggregation column $\alpha_q$, containing equality predicates restricting the i-th column to value (with $V_q(i) = *$ if no restriction is placed on the i-th column). The probability $Pr(Q_c = q)$ that query q is described in claim c is proportional to the product of the following factors: the prior probability of q appearing in the current document (i.e., $p_{f_q} \cdot p_{f_\alpha} \cdot \Pi_{i:V_q(i) \neq *} p_{r_i}$), the likelihood to receive the observed keyword-based relevance scores for q's query fragments (i.e., $S_c(f_q) \cdot S_c(\alpha_q) \cdot \Pi_i \ S_c(r_i = V_q(i))$ where $S_c(\ )$ generally maps fragments to their scores for claim c), and $p_T$ if the rounded query result matches the claim value (or $1 - p_T$ otherwise). We can use this formula to map each claim to a maximum likelihood query (line 12 in Algorithm 3). Note that it is not necessary to scale relevance scores since the scaling factor is constant for each specific claim. We only compare query candidates that have been selected for evaluation based on their keyword and prior-based probabilities alone (line 15 in Algorithm 3). Before providing further details on query evaluation, we present the following example to elaborate on the benefit of REFINEBYEVAL at line 15 in Algorithm 3.

We refer again to the claimed result "one" in the example of FIG. 3. Without near-perfect natural language understanding, it is almost impossible to map the phrase "lifetime bans" to query fragment GAMES='INDEF'. Nevertheless, the learned priors during EM iterations will at least tell us that a restriction is usually placed on column GAMES (11 out of 13 claims in this article have ground truth queries with restriction on GAMES). By evaluating many related query candidates, the system can find out that SELECT COUNT(*) FROM NFLSUSPENSIONS WHERE GAMES='INDEF' AND CATEGORY='GAMBLING' yields the same result as claimed in text (and largely no other queries do). Since we boost the probability of queries that evaluate to the claimed value, this query gets a higher refined probability (see FIG. 3(e)). It is noteworthy to mention that this is possible only when the system has learned the correct priors reflecting the common theme of ground truth queries. Nevertheless, articles typically have some easy cases (i.e., claims with distinctive keywords nearby) where the system can correctly translate into queries. Then, the system can also cope with other more difficult cases as the information gained from easy cases spreads across claims through EM iterations. Thus, the system benefits from easy cases and successfully learns the correct priors.

Query evaluation will now be described in detail. In fact-checking, we can partially resolve ambiguities in natural language understanding by evaluating large numbers of query candidates. As will become apparent, the ability to process large numbers of query candidates efficiently is important to making fact-checking practical in some embodiments.

The expectation maximization approach presented above relies on a sub-function, REFINEBYEVAL, to refine query probabilities by evaluating candidates.

FIG. 9 shows pseudocode of Algorithm 4, an example process that implements the REFINEBYEVAL function. The input is an unrefined probability distribution over query candidates per natural language claim, as well as the claim set and the database they refer to. The output is a refined probability distribution, taking into account query evaluation results.

Query evaluations are prioritized in the manner described below.

Ideally, we would be able to evaluate all query candidates with non-zero probability based on the initial estimates. By matching the results of those queries to results claimed in text, we would be able to gain the maximal amount of information. In practice, we must select a subset of query candidates to evaluate. To make the choice, we consider two factors. First, we consider the a-priori likelihood of the query to match the claim. Second, we consider the processing efficiency of evaluating many queries together.

Queries are characterized by three primary components in our model: an aggregation function, an aggregation column, and a set of predicates. In a first step (line 19 in Algorithm 4), we determine the evaluation scope as the set of alternatives that we consider for each query characteristic. To determine the scope, we use a cost model that takes into account the size of the database as well as the number of claims to verify. Function PICKSCOPE exploits the marginal probabilities of query characteristics. It expands the scope, prioritizing more likely alternatives, until estimated evaluation cost according to our cost model reaches a threshold.

Merging of query candidates is performed as follows.

As a naive approach, we could form all query candidates within the scope and evaluate them separately. This would however neglect several opportunities to save computation time by avoiding redundant work. First, alternative query candidates for the same claim tend to be quite similar. This means that the associated query plans can often share intermediate results, thereby amortizing computational overheads. Second, even the query candidates for different claims in the same document tend to be similar, thereby enabling us to amortize cost again. This relates to our observation that different claims in the same document are often semantically related. Finally, Algorithm 4 will be called repeatedly for the same document (over different iterations of the expectation maximization approach). In particular in later iterations, topic priors change slowly and likely query candidates for the same claim change only occasionally between iterations. This enables us to reuse results from previous iterations. Algorithm 4 exploits all three opportunities to avoid redundant work.

At the lowest layer, we use cube queries to efficiently calculate aggregates for different data subsets. Each data subset is associated with one specific combination of query predicates. One cube query can therefore cover many alternative query candidates as long as their equality predicates refer to a small set of columns (the cube dimensions). Executing a cube query on a base table yields aggregates for each possible value combination in the cube dimension. The result set can be large if cube dimensions contain many distinct values. In the context of fact-checking, we are typically only interested in a small subset of values (the ones with non-zero marginal probabilities, meaning that corresponding matches are returned after keyword matching). We can however not filter the data to rows containing those values before applying the cube operator: this would prevent us from obtaining results for query candidates that do not place any predicate on at least one of the cube dimensions. Instead, we apply the cube operator to the result of a sub-query that replaces all literals with zero marginal probability by a default value (function INORDEFAULT). This reduces the result set size while still allowing us to evaluate all related query candidates. Note that evaluating multiple aggregates for the same cube dimensions in the same query is typically more efficient than evaluating one cube query for each aggregate. Hence, we merge as many aggregates as possible for the same dimensions into the same query.

Referring once again to the example of FIG. 3, all four query candidates that are explicitly shown in FIG. 3(e) have the form: SELECT F$_{CT}$(A$_{GG}$) FROM T WHERE C$_{ATEGORY}$=V (AND G$_{AMES}$='INDEF'). Thus, it is sufficient to evaluate just one cube query to get their results: SELECT C$_{OUNT}$(*), P$_{ERCENTAGE}$(C$_{ATEGORY}$), S$_{UM}$(G$_{AMES}$) FROM T GROUP BY CUBE(C$_{ATEGORY}$, G$_{AMES}$). Nevertheless, we can notice that its result set would also contain many unnecessary aggregates for every distinct value combination of columns C$_{ATEGORY}$ and G$_{AMES}$. We instead restrict the cube query to only a small subset of values of interest, illustratively given by SELECT C$_{OUNT}$(*), P$_{ERCENTAGE}$(C$_{ATEGORY}$), S$_{UM}$(G$_{AMES}$), CASE WHEN C$_{ATEGORY}$='GAMBLING' THEN 1 WHEN C$_{ATEGORY}$='SUBSTANCE ABUSE' THEN 2 ELSE −1 END AS I$_{NOR}$D$_{EFAULT}$C$_{ATEGORY}$, CASE WHEN G$_{AMES}$='INDEF' THEN 1 ELSE −1 END AS I$_{NOR}$D$_{EFAULT}$G$_{AMES}$ FROM T GROUP BY CUBE(I$_{NOR}$D$_{EFAULT}$C$_{ATEGORY}$, I$_{NOR}$D$_{EFAULT}$G$_{AMES}$).

Illustrative embodiments also implement caching across claims and iterations in order to avoid redundant computation. The cache is accessed via functions I$_S$C$_{ACHED}$, C$_{ACHE}$G$_{ET}$, and C$_{ACHE}$P$_{UT}$ with the corresponding semantics. The cache persists across multiple iterations of the main loop in Algorithm 4 and across multiple invocations of Algorithm 4 for the same document (during expectation maximization). We avoid query evaluations if results are available in the cache and cache each generated result. We can choose the granularity at which results are indexed by the cache. Indexing results at a coarse granularity might force us to retrieve large amount of irrelevant data. Indexing results at a very fine granularity might create overheads when querying the cache and merging result parts. We found the following granularity to yield a good performance tradeoff: we index (partial) cube query results by a combination of one aggregation column, one aggregation function, and a set of cube dimensions. The index key does not integrate the set of relevant literals in the cube columns, although the set of literals with non-zero marginal probability may vary across different claims or iterations. We generate results for all literals that are assigned to a non-zero probability for any claim in the document (this set is equivalent to the set of literals in predicates returned during keyword matching). This simplifies indexing and is motivated by the observation that different claims tend to have high overlap in the sets of relevant literals for a given column.

To create more opportunities to share partial results, we cover the query scope via multiple cube queries, iterating over subsets of cube dimensions. Additionally, this prevents us from generating results for cube queries with an unrealistically high number of cube dimensions (e.g., we expect at most three predicates per claim in typical newspaper articles while the query scope may include several tens of predicate columns). On the other hand, we increase the total number of queries and generate redundant results. We use function $n_G(x)$ to pick the number of dimensions for each cube query. We chose $n_G(x)$=max(m, x−1) for our Postgres-based cube operator implementation where m is the maximal number of predicates per claim (we use m=3). Function C$_{UBE}$ in Algorithm 4 constructs the cube query (we use simplified SQL in the pseudocode), executes it, and returns the result. It uses function T$_{ABLE}$ to retrieve associated database tables for aggregates and predicates. It exploits join paths to identify connecting tables and join predicates. Our approach in illustrative embodiments assumes that the database schema is acyclic.

As mentioned previously, we evaluated AggChecker on 53 real articles, summarizing data sets and featuring 392 claims. Those test cases range from New York Times and 538 newspaper articles to summaries of Internet surveys. Using AggChecker, we were able to identify multiple erroneous claims in those articles, as confirmed by the article authors. Moreover, AggChecker exhibited accurate and efficient performance on multiple evaluation metrics, including both precision and recall, where precision is defined as the fraction of truly erroneous (according to ground truth) claims that the system has tentatively marked as erroneous, and recall is defined as the fraction of claims identified by the system as erroneous among the total set of truly erroneous claims.

Numerous variants of AggChecker are possible. For example, some embodiments of AggChecker are configured to consider keywords from multiple sources beyond the claim sentence, such as keywords from the previous sentence, keywords from the first sentence in the paragraph containing the claim sentence, and keywords from preceding headlines. It is also possible to consider synonyms of keywords. Generally, inclusion of such keyword enhancements tends to increase precision. Other variants can simplify the probabilistic model to exclude variables such as query evaluation results and/or priors, although such simplifications generally have a negative impact on performance.

In some AggChecker variants, tradeoffs can be made between processing time and result quality. For example, one can vary the number of query fragments, illustratively retrieved via Lucene in the manner described previously, that are considered during processing. Considering higher numbers of fragments generally increases the precision but leads to higher processing overheads. In some embodiments, we use about 20 query fragments per claim, a number which we believe achieves an appropriate tradeoff between result quality and processing overheads.

Different numbers of query fragments can be used in other embodiments.

Other tradeoffs can be made in AggChecker embodiments. For example, the above-described parameter $p_T$ can be varied. The parameter $p_T$ is the assumed a-priori probability of encountering correct claims. Varying $p_T$ provides different tradeoffs between precision (i.e., percentage of claims correctly marked up as wrong) and recall (i.e., percentage of erroneous claims spotted, based on the most likely query for each claim). Reducing $p_T$ makes the system more "suspicious" and increases recall at the cost of precision. We empirically determined that a value of $p_T$=0.999 provided a good tradeoff for our test data set. As another example, we can vary the number of hits to collect using Apache Lucene per claim, as well as the number of aggregation columns we consider during evaluation. Both affect run time and coverage. It turns out that a higher processing time budget generally results in greater coverage. On the other side, the increase in coverage diminishes as we evaluate more query candidates. Thus, as mentioned previously, evaluating a carefully chosen subset of query candidates is sufficient for achieving high coverage in illustrative embodiments.

Illustrative embodiments provide significant advantages relative to conventional approaches.

For example, illustrative embodiments operate on input that comprises text and associated structured data, and evaluate a claim based on consistency with the data, for purposes of verification of the claim.

Also, illustrative embodiments are iterative and refine claim-to-query translations in each iteration as new information becomes available.

In some embodiments, hierarchical structure of input text documents is exploited in translating claims to queries.

Moreover, illustrative embodiments exploit semantic correlations between multiple claims in the same document for more accurate translations.

Unlike conventional approaches that verify facts by exploiting natural language fact checks prepared by human fact checkers, natural language query interfaces to existing knowledge bases, or textual web query results, illustrative embodiments can perform fact checking utilizing raw relational data.

The foregoing are examples of advantages that are present in some embodiments, and need not be present in all embodiments.

It is to be appreciated that the various embodiments disclosed herein are presented by way of illustrative example only, and should not be construed as limiting in any way. For example, the example claim verification processes and algorithms and their particular features and implementation details as described above are considered illustrative embodiments only. Numerous alternative arrangements for verification of text summaries of relational data sets can be utilized in other embodiments.

Accordingly, the embodiments described above are considered illustrative only, and should not be viewed as limited to any particular arrangement of features. For example, those skilled in the art will recognize that additional or alternative particular processing modules, algorithms and associated pseudocode can be used in other embodiments.

It should also be noted that the above-described information processing system arrangements are exemplary only, and alternative system arrangements can be used in other embodiments.

A given client, server, processor or other component in an information processing system as described herein is illustratively configured utilizing a corresponding processing device comprising a processor coupled to a memory. The processor executes software program code stored in the memory in order to control the performance of processing operations and other functionality. The processing device also comprises a network interface that supports communication over one or more networks.

The processor may comprise, for example, a microprocessor, an ASIC, an FPGA, a CPU, an ALU, a GPU, a DSP, or other similar processing device component, as well as other types and arrangements of processing circuitry, in any combination. For example, a given cryptographic processing module of a processing device as disclosed herein can be implemented using such circuitry.

The memory stores software program code for execution by the processor in implementing portions of the functionality of the processing device. A given such memory that stores such program code for execution by a corresponding processor is an example of what is more generally referred to herein as a processor-readable storage medium having program code embodied therein, and may comprise, for example, electronic memory such as SRAM, DRAM or other types of random access memory, ROM, flash memory, magnetic memory, optical memory, or other types of storage devices in any combination.

Articles of manufacture comprising such processor-readable storage media are considered embodiments of the invention. The term "article of manufacture" as used herein should be understood to exclude transitory, propagating signals.

Other types of computer program products comprising processor-readable storage media can be implemented in other embodiments.

In addition, embodiments of the invention may be implemented in the form of integrated circuits comprising processing circuitry configured to implement processing operations associated with verifying text summaries of relational data sets as well as other related functionality.

Processing devices in a given embodiment can include, for example, laptop, tablet or desktop personal computers, mobile telephones, or other types of computers or communication devices, in any combination. For example, a computer or mobile telephone can be utilized by a user to interact with the verification platform 102 to access claim verification functionality of the type disclosed herein. These and other communications between the various elements of an information processing system comprising processing devices associated with respective system entities may take place over one or more networks.

An information processing system as disclosed herein may be implemented using one or more processing platforms, or portions thereof.

For example, one illustrative embodiment of a processing platform that may be used to implement at least a portion of an information processing system comprises cloud infrastructure including virtual machines implemented using a hypervisor that runs on physical infrastructure. Such virtual machines may comprise respective processing devices that communicate with one another over one or more networks.

The cloud infrastructure in such an embodiment may further comprise one or more sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the information processing system.

Other types of virtualization may additionally or alternatively be used in a given processing platform in illustrative embodiments. For example, Docker containers or other types of containers implemented using respective kernel control groups of an operating system of a given processing device may be used. It is also possible for such containers to run on virtual machines controlled by a hypervisor.

Another illustrative embodiment of a processing platform that may be used to implement at least a portion of an information processing system as disclosed herein comprises a plurality of processing devices which communicate with one another over at least one network. Each processing device of the processing platform is assumed to comprise a processor coupled to a memory.

Again, these particular processing platforms are presented by way of example only, and an information processing system may include additional or alternative processing platforms, as well as numerous distinct processing platforms in any combination, with each such platform comprising one or more computers, servers, storage devices or other processing devices.

For example, other processing platforms used to implement embodiments of the invention can comprise different types of virtualization infrastructure in place of or in addition to virtualization infrastructure comprising virtual machines, such as operating system based virtualization infrastructure comprising containers implemented using respective kernel control groups.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, certain types of claim verification functionality associated with a given processing device can be implemented at least in part in the form of software.

The particular configurations of information processing systems described herein are exemplary only, and a given such system in other embodiments may include other elements in addition to or in place of those specifically shown, including one or more elements of a type commonly found in a conventional implementation of such a system.

For example, in some embodiments, an information processing system may be configured to utilize the disclosed claim verification techniques to provide additional or alternative functionality in other contexts.

Thus, techniques illustrated in some embodiments herein in the context of verifying text summaries of relational data sets can be adapted in a straightforward manner for use in other contexts. Accordingly, illustrative embodiments of the invention should not be viewed as limited to particular text summaries, relational data sets or other particular features or their associated processing contexts.

It is also to be appreciated that the particular process steps used in the embodiments described above are exemplary only, and other embodiments can utilize different types and arrangements of processing operations. For example, certain process steps shown as being performed serially in the illustrative embodiments can in other embodiments be performed at least in part in parallel with one another.

It should again be emphasized that the embodiments of the invention as described herein are intended to be illustrative only. Other embodiments of the invention can be implemented utilizing a wide variety of different types and arrangements of information processing systems, networks and devices than those utilized in the particular illustrative embodiments described herein, and in numerous alternative claim verification contexts. In addition, the particular assumptions made herein in the context of describing certain embodiments need not apply in other embodiments. These and numerous other alternative embodiments will be readily apparent to those skilled in the art.

What is claimed is:

1. An apparatus comprising:
a processing platform comprising one or more processing devices each including at least one processor coupled to a memory;
the processing platform being configured:
to obtain a text document containing at least one claim about data of a relational database;
to extract claim keywords from the text document;
to identify query fragments based at least in part on indexing of one or more relational data sets of the relational database;
to determine relevance of the claim keywords to the query fragments;
to identify candidate queries based at least in part on probabilistic inferencing from the determined relevance of the claim keywords to the query fragments;
to evaluate the candidate queries against the relational database; and
to determine consistency of the claim with the data of the relational database based at least in part on results of the evaluation of the candidate queries;
wherein identifying candidate queries based at least in part on probabilistic inferencing from the determined relevance of claim keywords to query fragments comprises:
applying relevance scores for a set of query fragments each having above a specified threshold relevance to the claim as input to a probabilistic model; and
utilizing the probabilistic model to map the claim to a probability distribution over candidate queries based at least in part on the relevance scores for the set of query fragments.

2. The apparatus of claim 1 wherein the relational database is managed by a relational database management system associated with the processing platform.

3. The apparatus of claim 1 wherein extracting claim keywords from the text document comprises:
determining a multi-level hierarchical structure of the text document;
identifying a claim sentence at a relatively low level of the multi-level hierarchical structure; and
extracting one or more claim keywords from each of one or more higher levels of the multi-level hierarchical structure.

4. The apparatus of claim 3 wherein extracting one or more claim keywords from each of one or more higher levels of the multi-level hierarchical structure comprises:
identifying a paragraph that includes the claim sentence; and
extracting one or more claim keywords from at least one headline in each of the one or more higher levels from one or more paragraphs other than the paragraph that includes the claim sentence.

5. The apparatus of claim 3 wherein extracting one or more claim keywords from each of one or more higher levels of the multi-level hierarchical structure comprises:
identifying a paragraph that includes the claim sentence; and
extracting one or more claim keywords from each of one or more additional sentences in the paragraph that includes the claim sentence;
wherein the one or more additional sentences comprise at least one of a first sentence of the paragraph and a sentence adjacent to the claim sentence in the paragraph.

6. The apparatus of claim 1 wherein the query fragments comprise at least one of aggregation functions, aggregation columns and unary equality predicates of aggregate queries that reference the one or more relational data sets.

7. The apparatus of claim 1 wherein determining relevance of the claim keywords to the query fragments comprises:
identifying matches between the claim keywords and the query fragments; and generating relevance scores based at least in part on the matches;

wherein the relevance scores relate the claim to respective ones of the query fragments.

8. The apparatus of claim 7 wherein the query fragments are indexed by sets of keywords, and identifying matches between the claim keywords and the query fragments comprises querying the indexed query fragments utilizing the claim keywords as queries.

9. The apparatus of claim 7 wherein the relevance scores generated based at least in part on the matches are utilized to identify a set of query fragments each having above a specified threshold relevance to the claim.

10. The apparatus of claim 1 wherein
the probability distribution comprises probabilities of respective ones of the candidate queries, with a given one of the probabilities specifying a probability that the claim translates to the corresponding candidate query.

11. The apparatus of claim 10 wherein the probabilistic model comprises model parameters representing a-priori probability of correct claims and further wherein the candidate query probabilities depend at least in part on whether their respective evaluation results match one or more claimed values.

12. The apparatus of claim 1 wherein the probabilistic model comprises model parameters representing a document-specific query distribution and latent variables representing respective claim-specific query distributions, and wherein the processing platform is further configured to iteratively refine values of the model parameters and a probability distribution of the latent variables of the probabilistic model in processing multiple claims from one or more text documents.

13. The apparatus of claim 1 wherein evaluating the candidate queries against the relational database comprises:
merging multiple ones of the candidate queries into a composite query; and
evaluating the composite query against the relational database to yield evaluation results for respective ones of the multiple candidate queries merged into the composite query.

14. The apparatus of claim 1 wherein determining consistency of the claim with the data of the relational database based at least in part on results of the evaluation of the candidate queries comprises generating a probability of correctness for the claim.

15. The apparatus of claim 14 wherein the processing platform is further configured to modify presentation via a user interface of at least a portion of the text document containing the claim based at least in part on the probability of correctness.

16. The apparatus of claim 1 wherein the processing platform is further configured:
to present a plurality of ranked potential queries via a user interface; and
to receive user feedback regarding one or more of the ranked potential queries.

17. A method comprising:
obtaining a text document containing at least one claim about data of a relational database;
extracting claim keywords from the text document;
identifying query fragments based at least in part on indexing of one or more relational data sets of the relational database;
determining relevance of the claim keywords to the query fragments;

identifying candidate queries based at least in part on probabilistic inferencing from the determined relevance of the claim keywords to the query fragments;
evaluating the candidate queries against the relational database; and
determining consistency of the claim with the data of the relational database based at least in part on results of the evaluation of the candidate queries;
wherein identifying candidate queries based at least in part on probabilistic inferencing from the determined relevance of the claim keywords to the query fragments comprises:
applying relevance scores for a set of query fragments each having above a specified threshold relevance to the claim as input to a probabilistic model; and
utilizing the probabilistic model to map the claim to a probability distribution over candidate queries based at least in part on the relevance scores for the set of query fragments; and
wherein the method is performed by a processing platform comprising at least one processing device comprising a processor coupled to a memory.

18. The method of claim 17 wherein the probabilistic model comprises model parameters representing a document-specific query distribution and latent variables representing respective claim-specific query distributions, and wherein the method further comprises iteratively refining values of the model parameters and a probability distribution of the latent variables of the probabilistic model in processing multiple claims from one or more text documents.

19. The method of claim 17 wherein the probability distribution comprises probabilities of respective ones of the candidate queries, with a given one of the probabilities specifying a probability that the claim translates to the corresponding candidate query.

20. The method of claim 19 wherein the probabilistic model comprises model parameters representing a-priori probability of correct claims and further wherein the candidate query probabilities depend at least in part on whether their respective evaluation results match one or more claimed values.

21. A computer program product comprising a non-transitory processor-readable storage medium having stored therein program code of one or more software programs, wherein the program code when executed by at least one processing device of a processing platform causes processing platform:
to obtain a text document containing at least one claim about data of a relational database;
to extract claim keywords from the text document;
to identify query fragments based at least in part on indexing of one or more relational data sets of the relational database;
to determine relevance of the claim keywords to the query fragments;
to identify candidate queries based at least in part on probabilistic inferencing from the determined relevance of the claim keywords to the query fragments;
to evaluate the candidate queries against the relational database; and
to determine consistency of the claim with the data of the relational database based at least in part on results of the evaluation of the candidate queries;
wherein identifying candidate queries based at least in part on probabilistic inferencing from the determined relevance of the claim keywords to the query fragments comprises:

applying relevance scores for a set of query fragments each having above a specified threshold relevance to the claim as input to a probabilistic model; and utilizing the probabilistic model to map the claim to a probability distribution over candidate queries based at least in part on the relevance scores for the set of query fragments.

22. The computer program product of claim 21 wherein the probabilistic model comprises model parameters representing a document-specific query distribution and latent variables representing respective claim-specific query distributions, and wherein the processing platform is further configured to iteratively refine values of the model parameters and a probability distribution of the latent variables of the probabilistic model in processing multiple claims from one or more text documents.

* * * * *